US009218685B2

(12) United States Patent
Piemonte et al.

(10) Patent No.: US 9,218,685 B2
(45) Date of Patent: Dec. 22, 2015

(54) SYSTEM AND METHOD FOR HIGHLIGHTING A FEATURE IN A 3D MAP WHILE PRESERVING DEPTH

(71) Applicant: Apple Inc., Cupertino, CA (US)

(72) Inventors: Patrick S. Piemonte, San Francisco, CA (US); Billy P. Chen, Santa Clara, CA (US); Christopher Blumenberg, San Francisco, CA (US); Edward Kandrot, San Jose, CA (US)

(73) Assignee: Apple Inc., Cupertino, CA (US)

( * ) Notice: Subject to any disclaimer, the term of this patent is extended or adjusted under 35 U.S.C. 154(b) by 168 days.

(21) Appl. No.: 13/708,349

(22) Filed: Dec. 7, 2012

(65) Prior Publication Data

US 2013/0321403 A1  Dec. 5, 2013

Related U.S. Application Data

(60) Provisional application No. 61/655,942, filed on Jun. 5, 2012.

(51) Int. Cl.
*G06T 15/00* (2011.01)
*G06K 9/40* (2006.01)
*G06T 15/50* (2011.01)
*G06T 19/20* (2011.01)
*G01C 21/36* (2006.01)

(52) U.S. Cl.
CPC ............ *G06T 15/00* (2013.01); *G01C 21/3638* (2013.01); *G01C 21/3682* (2013.01); *G06T 15/503* (2013.01); *G06T 19/20* (2013.01); *G06T 2210/62* (2013.01); *G06T 2219/2012* (2013.01)

(58) Field of Classification Search
CPC ................................ G06T 19/00; G06T 5/001
USPC .......................................... 345/419; 382/254
See application file for complete search history.

(56) References Cited

U.S. PATENT DOCUMENTS

| | | |
|---|---|---|
| 5,634,129 A | 5/1997 | Dickinson |
| 8,014,946 B2 | 9/2011 | Rasmussen et al. |
| 2005/0163345 A1 * | 7/2005 | van den Bergen et al. ... 382/103 |
| 2008/0170067 A1 * | 7/2008 | Kim et al. ...................... 345/419 |
| 2008/0219493 A1 * | 9/2008 | Tadmor ......................... 382/100 |
| 2010/0164956 A1 | 7/2010 | Hyndman et al. |
| 2011/0084893 A1 * | 4/2011 | Lee et al. .......................... 345/6 |
| 2011/0161875 A1 * | 6/2011 | Kankainen .................... 715/810 |
| 2011/0279452 A1 * | 11/2011 | Ibe et al. ........................ 345/419 |
| 2012/0050285 A1 * | 3/2012 | Kannenberg .................. 345/419 |
| 2012/0127169 A1 * | 5/2012 | Barcay et al. ................. 345/419 |
| 2012/0140995 A1 * | 6/2012 | Kawamura et al. ........... 382/118 |

* cited by examiner

*Primary Examiner* — Phi Hoang
*Assistant Examiner* — Yi Yang
(74) *Attorney, Agent, or Firm* — Robert C. Kowert; Meyertons, Hood, Kivlin, Kowert & Goetzel, P.C.

(57) ABSTRACT

Systems and methods for rendering 3D maps may highlight a feature in a 3D map while preserving depth. A map tool of a mapping or navigation application that detects the selection of a feature in a 3D map (e.g., by touch) may perform a ray intersection to determine the feature that was selected. The map tool may capture the frame to be displayed (with the selected feature highlighted) in several steps. Each step may translate the map about a pivot point of the selected map feature (e.g., in three or four directions) to capture a new frame. The captured frames may be blended together to create a blurred map view that depicts 3D depth in the scene. A crisp version of the selected feature may then be rendered within the otherwise blurred 3D map. Color, brightness, contrast, or saturation values may be modified to further highlight the selected feature.

22 Claims, 16 Drawing Sheets

SYSTEM AND METHOD FOR HIGHLIGHTING A FEATURE IN A 3D MAP WHILE PRESERVING DEPTH

This application claims benefit of priority to U.S. Provisional Application Ser. No. 61/655,942, entitled "System And Method For Highlighting A Feature In A 3D Map While Preserving Depth," filed Jun. 5, 2012.

BACKGROUND

1. Technical Field

This disclosure relates generally to map rendering, and, more specifically, to functionality of devices providing map applications.

2. Description of the Related Art

Personal navigation devices (e.g., handheld GPS devices and some mobile phones) and other computing devices may implement a mapping application capable of displaying a three-dimensional (3D) map in perspective, indicating depth in the scene. For example, some 3D maps include representations of roads, buildings, bridges, or other structures, and/or geological features, such as hills, bodies of water, etc. By drawing a 3D map in perspective, a mapping application can generate and display a map view that provides visual clues about the relative positions and/or depths of these features in 3D space. Some 3D map applications represent 3D features within maps using simplified shapes (e.g., block shapes), while others represent 3D features using more realistically-shaped models of the 3D features.

Some mapping applications provide techniques for highlighting a selected feature (e.g., a building or another point of interest) or a portion of the scene (e.g., an area within a selected boundary). Some mapping applications highlight a selected feature or portion of a map by changing the color of the selected feature or portion of the map to indicate its selection. Other mapping applications highlight a selected feature or portion of a map by outlining a boundary of the selected feature or portion of the map (e.g., superimposing a wide and/or high-contrast tracing of the boundary over the map). Still other mapping applications highlight a selection by performing a two-dimensional (2D) blur of the image data (i.e., the screen data) in non-selected portions of the map.

SUMMARY OF EMBODIMENTS

Embodiments of the present disclosure may enable a computing device to implement a mapping application or a navigation application that highlights a selected feature of a 3D map (e.g., a selected building, subway station, sign, 3D map annotation, geological feature, or another 3D object visible in the scene) while maintaining depth in the scene. For example, a user that is using a 3D mapping application and looking at a 3D scene (e.g., a simplified model of terrain and/or buildings in a scene, or highly detailed cerographic image) may select a portion of the scene (e.g., a building or another object/item). The user may wish to highlight the selected portion while retaining the visual clues that give the map view a 3D look (e.g., perspective or other visual indicators of 3D depth).

In some embodiments, a map tool of a mapping application or navigation application may detect the selection of a map feature in 3D space (e.g., using touch on a display screen), and may generate multiple alternate versions of the 3D map (i.e., multiple alternate map views) by pivoting the scene about a focus point (sometimes referred to herein as a "pivot point") for the selected feature. For example, the map tool may tilt or pivot the 3D map to the left, to the right, forward, and/or backward about the pivot point to generate alternate versions of the 3D map. The alternate versions of the 3D map generated by such pivoting may be blended together or otherwise combined to create a blurred version of the 3D map that maintains depth for the scene (e.g., by averaging the image data for pixels in the same positions in the alternate versions of the 3D map to generate image data for corresponding pixels in the blurred version of the 3D map).

In some embodiments, the blurred version of the 3D map may be rendered on the computing device, and an unblurred version (e.g., the original crisp version) of the selected feature may be rendered along with it (e.g., superimposed on the blurred version of the map). Thus, the selected feature may stand out as a crisp 3D object within an otherwise blurred 3D map. In some embodiments, the color, brightness, contrast, or saturation values of the image data for the selected feature and/or for the blurred version of the 3D map may be modified to provide further highlighting of the selected feature.

Figure 1A:
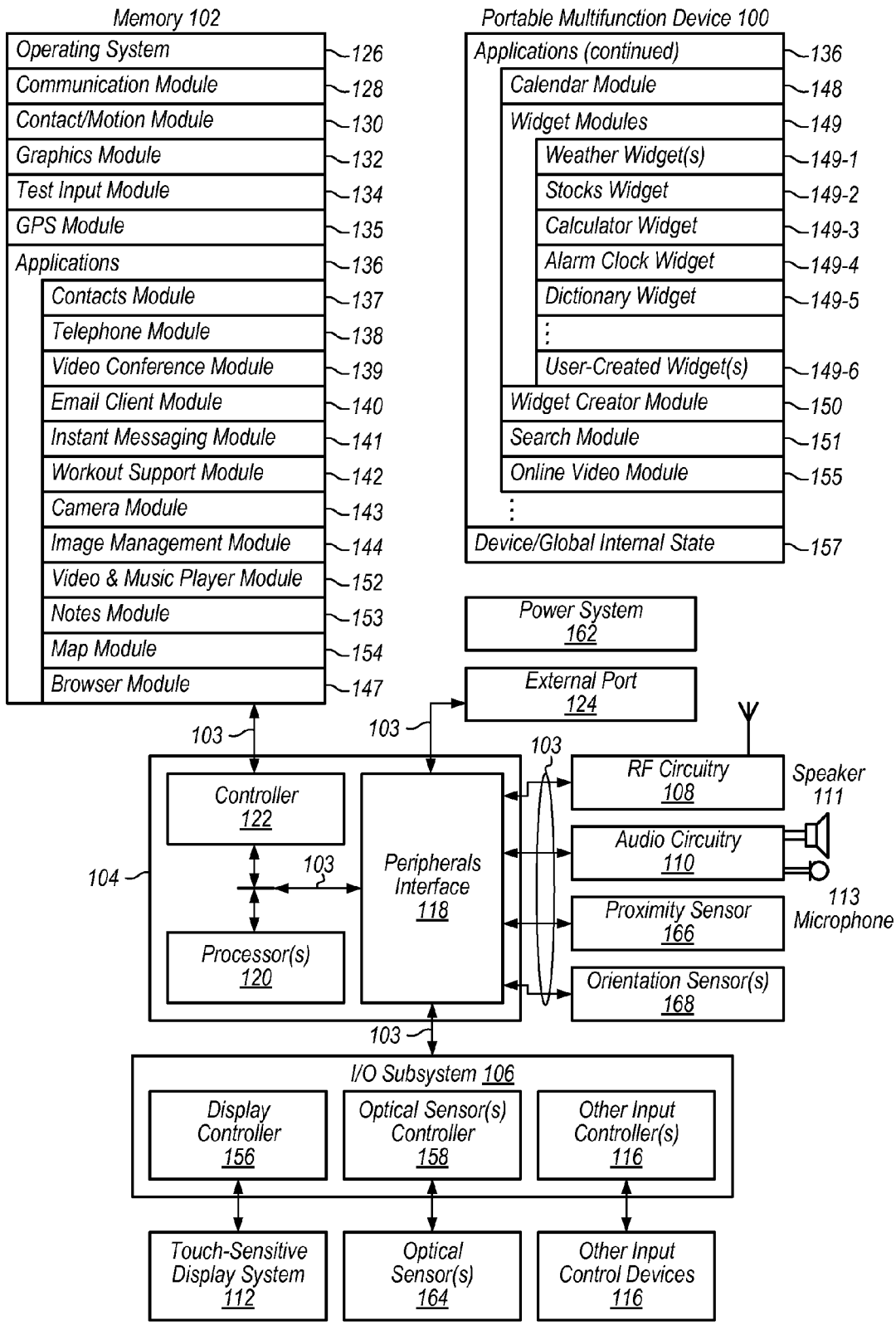
FIG. 1A illustrates a block diagram illustrating a portable multifunction device with a touch-sensitive display in accordance with some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Introduction

Various embodiments of a system and method for highlighting features in a 3D map while preserving the perception of depth are described. In some embodiments, the map tools, mapping applications, and/or navigation applications described herein may be implemented as part of various multifunction devices, including but not limited to mobile phones that have GPS functionality, tablet computing devices, and/or personal navigation devices. A user of such a multifunction device may interact with a mapping application capable of displaying a 3D map in perspective, so that it provides visual clues about the relative positions and/or depths of various features of the map in 3D space.

In some embodiments, when viewing a 3D map in perspective, a user may pick or select an annotation, building, or other map object in 3D space to be highlighted in the map. In response to the selection of the map feature, the display of the map may be modified in order to visually accent the selected feature. In some current mapping systems, visual accents or changes that are used to highlight a selection in 3D space map cause the display to lose the depth of the scene, which may result in an unnatural appearance, and/or in losing visual clues about the user's location relative to other features in the 3D space. In some embodiments, the systems and methods described herein may enable a computing device to implement a map tool of mapping application or a navigation application that highlights a selected feature of a 3D map (e.g., a selected building, subway station, park, sign, 3D map annotation, or another 3D object visible in the scene) while preserving the perception of depth. More specifically, the map tools described herein may, in effect, pivot a 3D scene (e.g., a view of a 3D map) to generate multiple alternate views of the scene, and may create a blurred version of the 3D map by blending those views, while maintaining the crispness of a selected feature in the scene.

In some embodiments, the map tool, mapping application, or navigation application may detect the selection of a feature of a 3D map in 3D space. For example, a multifunction device on which the tool or application is implemented may include a touch screen, and a map tool may receive information about the selection of a feature by a user through this interface. In other embodiments, a feature may be selected by a user from a menu, or from a list of search results. In still other embodiments, the selection of a feature to be highlighted may be performed automatically by the map tool, which may select a popular or historically significant point of interest in the scene being displayed or along a route to be taken by the user.

As noted above and described in more detail herein, the map tool may perform a 3D blur operation on a 3D map view by generating two or more alternate versions of the map view, each of which represents a respective view of the map from a different viewing position and/or orientation. In some embodiments, each of the alternate versions of the map view may be generated as if the map were viewed (e.g., through a virtual camera) from a viewing position and/or angle that differs from an initial viewing angle and/or position by a pre-determined amount in a respective direction. For example, the alternate versions of the map view may be generated from the perspective of a camera that has been re-positioned and tilted (e.g., at a pre-determined angle) in each of two or more directions relative to the initial camera orientation (e.g., forward, backward, left, and right). This may have the effect of pivoting the scene (i.e., the 3D map view) around the point at which the virtual camera is focused (i.e., the "pivot point"). The map tool may then blend (or otherwise combine) the alternate versions of the map view to produce a blurred version of the map. In some embodiments, this blending operation may include averaging values of the pixels in the same position in the alternate versions to generate a value for a pixel in the corresponding position of the blurred version of the map. In some embodiments, the 3D blurring techniques described herein may cause the amount of blur in the scene to vary with the distance from the highlighted 3D feature in three-dimensional space.

In some embodiments, the selected feature may be further highlighted by modifying a color, brightness, contrast, or saturation value for pixels of the blurred version of the map or the unblurred version of the selected feature. In some embodiments, if another feature in the map occludes the selected feature (or at least a portion of the selected feature), the occluding feature may be rendered as a semi-transparent feature in the map, or the blur operation may be performed by generating at least one of the alternate map views from the perspective of a virtual camera placed in a position such that the occluding feature no longer blocks the view of the selected feature.

Multifunction Device

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad). In some embodiments, the device is a gaming computer with orientation sensors (e.g., orientation sensors in a gaming controller).

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIG. 1A may be implemented in hardware, software, or a combination of hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. In some embodiments, the proximity sensor turns off and disables touch screen 112 when the multifunction device is placed near the user's ear (e.g., when the user is making a phone call).

Device 100 includes one or more orientation sensors 168. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 100. In some embodiments, the one or more orientation sensors include any combination of orientation/rotation sensors. FIG. 1A shows the one or more orientation sensors 168 coupled to peripherals interface 118. Alternately, the one or more orientation sensors 168 may be coupled to an input controller 160 in I/O subsystem 106. In some embodiments, information is displayed on the touch screen display in a portrait view or a landscape view based on an analysis of data received from the one or more orientation sensors.

Figure 3:
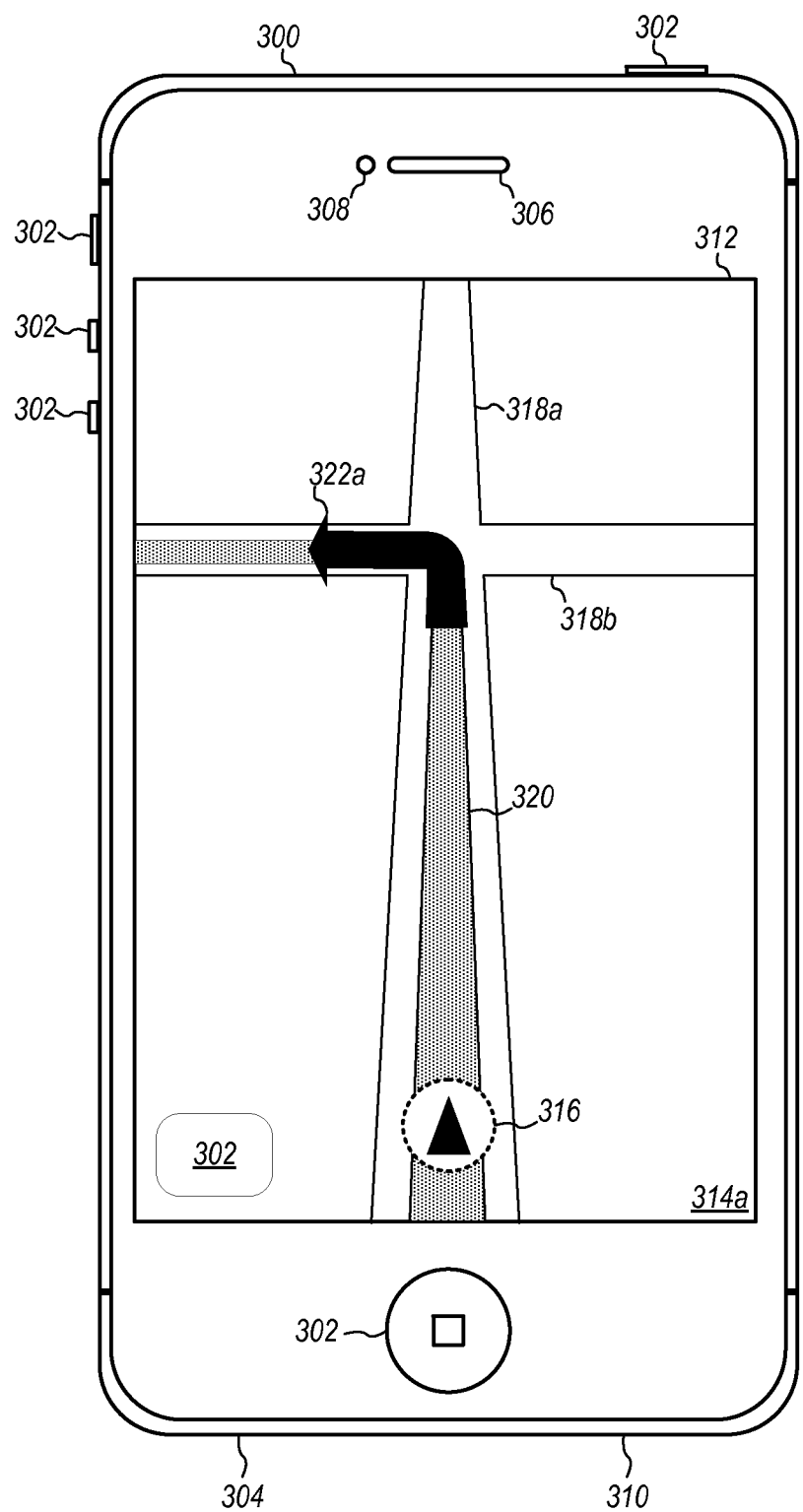
FIG. 3 illustrates a multifunction device implementing a navigation application in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detect contact on a touchpad.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which may be made up of a video player module and a music player module;
- notes module 153;
- map module 154; and/or
- online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 1493, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 may include the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 1B:
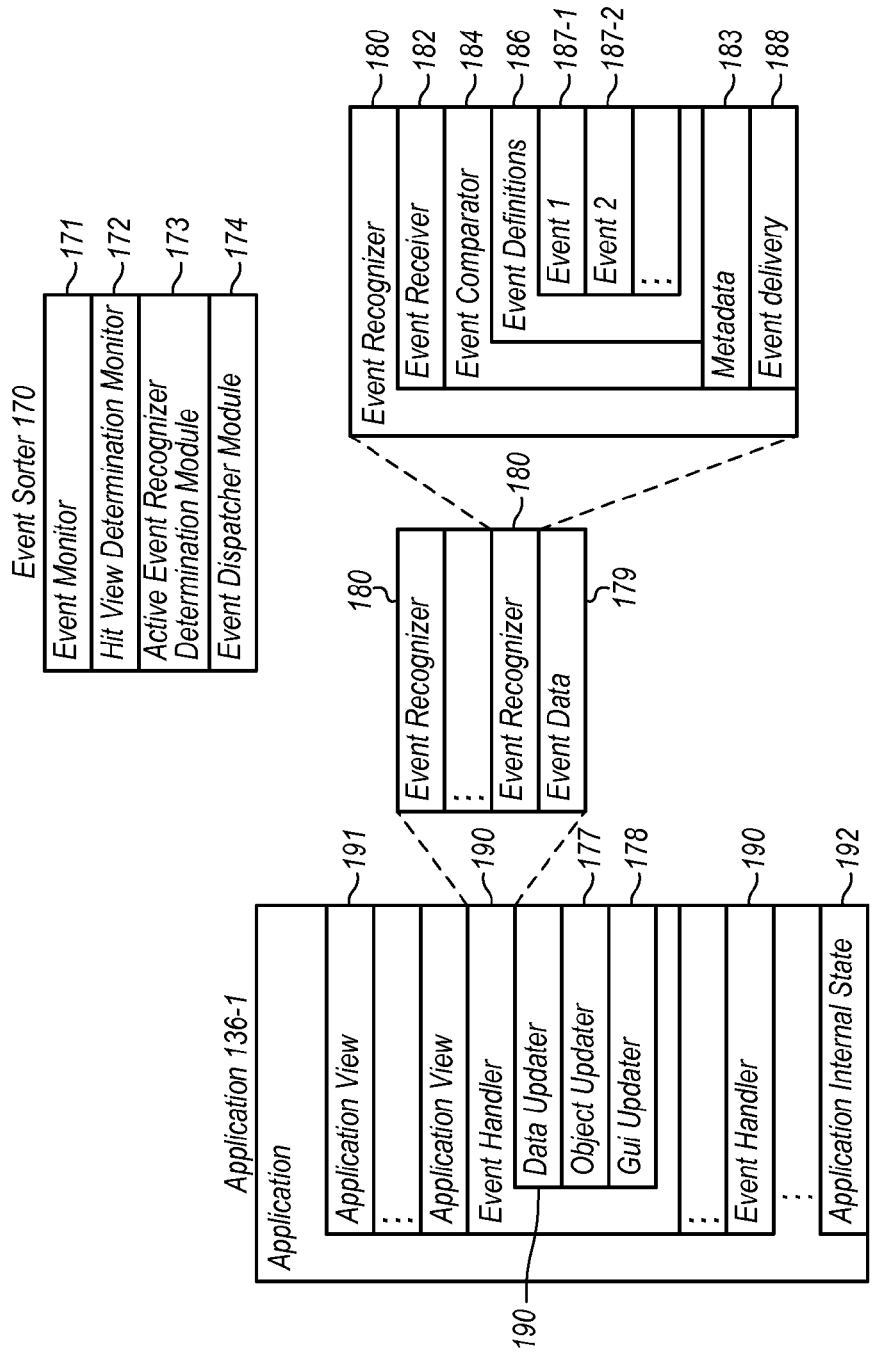
FIG. 1B illustrates a block diagram illustrating example components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch sensitive display 112, as part of a multi-touch gesture). Peripherals interface 118 transmits information it receives from I/O subsystem 106 or a sensor, such as proximity sensor 166, orientation sensor(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes multiple event handlers 190 and one or more application views 191, each of which includes instructions for handling touch events that occur within a respective view of the application's user interface. Each application view 191 of the application 136-1 includes one or more event recognizers 180. Typically, a respective application view 191 includes multiple event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, includes a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, includes a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

Figure 2:
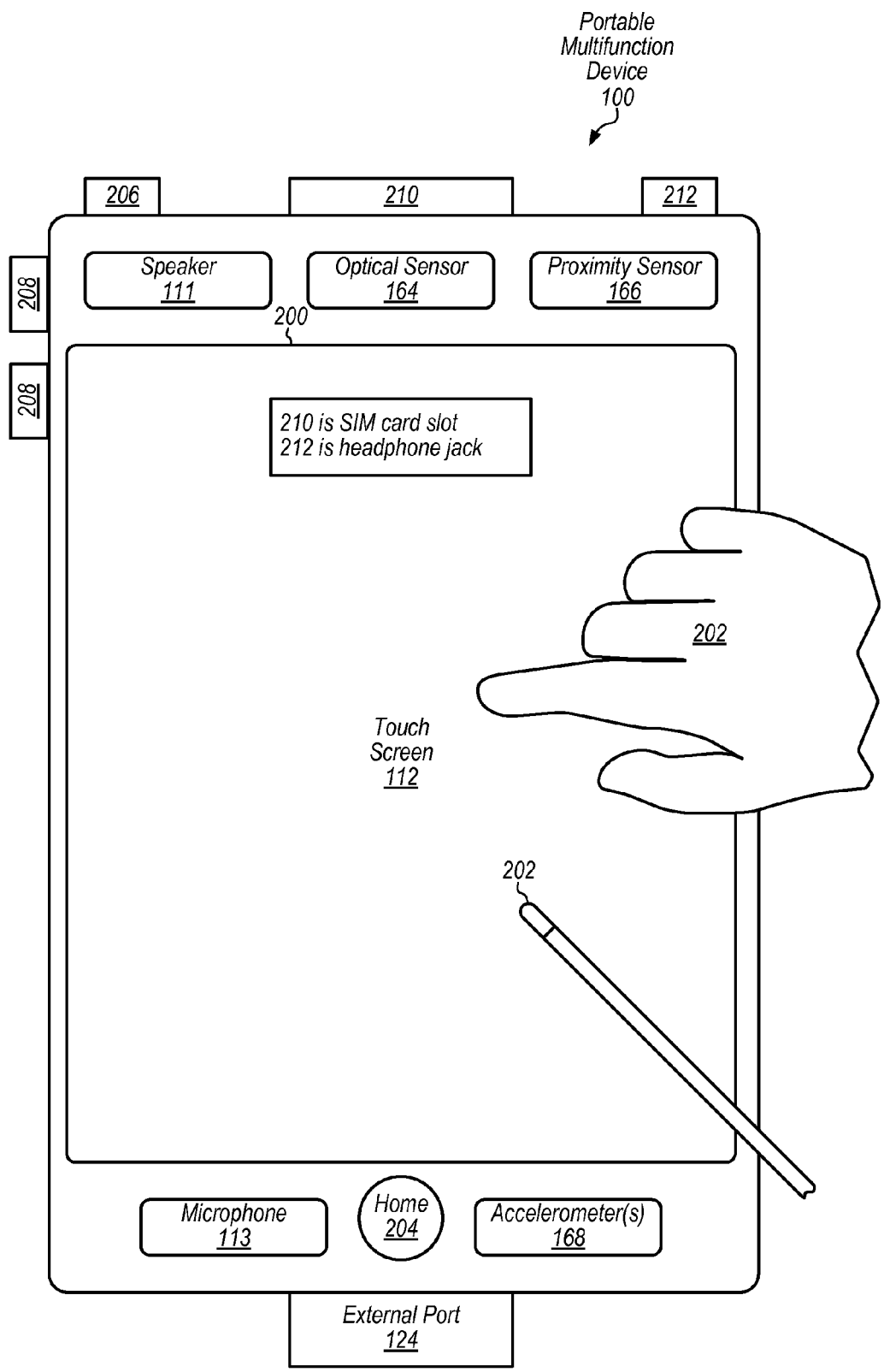
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture may include one or more taps, one or more swipes (from left to right, right to left, upward and/or downward) and/or a rolling of a finger (from right to left, left to right, upward and/or downward) that has made contact with device 100. In some embodiments, inadvertent contact with a graphic may not select the graphic. For example, a swipe gesture that sweeps over an application icon may not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

It should be noted that, although many of the following examples will be given with reference to inputs on touch screen 112 (where the touch sensitive surface and the display are combined), a touch-sensitive surface that is separate from the display may be used instead of touch screen 112.

Mapping Functionality

FIG. 3 illustrates another example of a multifunction device, which may be configured in a manner similar to the multifunction device described above. In the illustrated embodiment, a multifunction device 300 includes a mapping application (e.g., map module 154 described above) that may be stored in one or more memories of multifunction device 300 and executed on one or more processors of multifunction device 300. As is the case for the multifunction device described above, multifunction device 300 may include one or more controls 302 for operating the multifunction device. These controls may include but are not limited to power controls for turning the device on and off, volume controls for adjusting the ear piece volume or the speaker volume, menu controls for navigation functions of the device, and function controls for initiating one or more function or actions on the device. Controls 302 may include hardware controls or software controls. For instance, the bottom left corner of electronic display 312 includes a graphical representation of a control 302 that may be selected by a user, such as by way of touch in accordance with the touch screen functionality described above. Multifunction device 300 may also include other components similar to those described above, such as a microphone 304, an earpiece 306 (e.g., a speaker through which to convey audio representations of telephone calls), an optical sensor 308, and/or a speaker 310. Each of these components may be configured in a similar manner to those like-named components of FIG. 2 described above. Furthermore, electronic display 312 may be configured with touch screen capability, such as touch screen 112 described above.

As noted above, multifunction device 300 includes a mapping application that may be stored in one or more memories of multifunction device 300 and executed on one or more processors of multifunction device 300. In the illustrated embodiment, the graphical representation of the mapping application may include a map instance 314a of a geographic region. This map may be presented as a two-dimensional map or a three-dimensional map, the selection of which may be specified through, e.g., a user-configurable parameter of the mapping application. Map instance 314a may include a graphical position indicator 316, which may represent the location of the multifunction device within the geographic region of the map. Generally position indicator 316 may represent the current or real-time position of the multifunction device, although it should be understood that in some cases there may exist some small amount of temporal latency between the actual position of the multifunction device and the graphical representation of that location (e.g., position indicator 316). This may occur, e.g., when the multifunction device is in motion.

Furthermore, multifunction device 300 may generally be operated by a user. For example, multifunction device 300 may in some cases be a smartphone utilized by an individual to make phone calls, send text messages, browse the internet, etc. As use of multifunction device by an individual generally implies the individual is proximate to the multifunction device (e.g., the user may be holding the device in his or her hand), references herein to the location of the device and the location of the user may be considered to be synonymous. However, it should be understood that in some cases the actual position of the multifunction device and the user of that device may differ by some distance. For instance, the user may place his or her multifunction device on a table of an outdoor café while sitting in a nearby chair. In this case, the position of the device and the position of the user may differ by some small amount. In another example, multifunction device 300 may be mounted on a car dashboard (e.g., for use as a navigation device) while the user of the device sits nearby (e.g., in the driver seat of the car). In this case as well, the position of the device and the position of the user may differ by some small amount. Despite these small differences in position, generally the position of the multifunction device and the position of the multifunction device user may be considered to coincide.

In various embodiments, the map instance 314a displayed by the multifunction device may include one or more roads (e.g., roads 318a-b), buildings (not illustrated), terrain features (e.g., hills, mountains) (not illustrated), parks (not illustrated), water bodies (not illustrated), and/or any other item that may be conveyed by a map. In some cases, the map may also include other map or navigation information including but not limited to readouts from one or more of a directional compass, an altimeter, and/or a thermometer.

In various embodiments, the mapping application may be configured to generate directions from an origination (e.g., an address or a user's current position) to a destination (e.g., an address, landmark, or point of interest). For instance, an indication of the origination and/or destination may be input into the multi function device by the user. The multifunction device may generate one or more candidate routes between those two points. The multifunction device may select one of those routes for display on the device. In other cases, multiple candidate routes may be presented to the user and the user may select a preferred route. In the illustrated embodiment, one route is illustrated as route 320. The route may also include turn-by-turn directions which may be presented to the user, such as a graphical indication to perform a turn 322a from road 318a to road 318b. In some embodiments, this graphical indication to perform a turn may be supplemented or substituted with an audible indication to turn, such as a voice command from speaker 310 that indicates the user is to "turn left in 100 yards," for example.

In various embodiments, the mapping application of the multifunction device may be configured to track the position of the user over time and correspondingly adjust the graphical position indicator 316 to indicate the new position. For instance, the mapping application may determine that the user is traveling along route 320 from position information (e.g., information from GPS module 135) and update the map instance 314a accordingly. For instance, in some cases the map instance 314a may remain stationary while position indicator 316 is moved along the route. In other cases, position indicator 316 may remain stationary or "fixed" while map instance 314a is moved (e.g., panned, turned, etc.) around the position indicator.

In other embodiments, the mapping application may be configured to perform other functions including but not limited to geocaching, creating or interpreting waypoints, searching for and displaying points of interest (POIs) (e.g., gas stations, banks, grocery stores, etc.), displaying traffic information, and/or any other functionality useful for navigation.

Further note that the positioning capability of the multifunction device and the mapping application need not be limited to any particular type of transportation. The techniques described herein may be well-suited for all kinds of transportation including but not limited to walking, cycling, driving, or utilizing public transportation.

Mapping Application—Highlighting Selected Features in 3D Maps

As previously described, when viewing a 3D map in perspective (e.g., using a mapping application or navigation application), a user may wish to highlight (or to have the map tool highlight) a particular annotation, building, or other 3D map object or point of interest in 3D space. For example, when viewing a 3D map in a mapping application, the user may touch or otherwise select a map feature about which the user would like more information. In another example, when viewing a 3D map in a navigation application, the user may touch or otherwise select a map feature as an intermediate or final destination to which the user needs directions. In yet another example, when a user is navigating to a destination, a navigation application may select a point of interest along the user's route as a landmark for traversing the route, or to suggest that the user visit the selected point of interest. In response to these and other situations in which a map feature is selected, a map tool of the mapping application or navigation application may highlight the selected feature in the 3D map using any or all of the techniques described herein.

As noted above, in order to maintain visual clues about the 3D depth of a selected feature of a 3D map and also provide a visual accent, the map tool may in some embodiments perform a variety of rendering steps that result in a 3D radial blur of the 3D map about a crisp focus point. This crisp focus point may be a point on the 3D selected object (e.g., a point on which a virtual camera would be focused given the current viewing direction and/or orientation of the virtual camera). While this focus point remains crisp (i.e. while it can be seem clearly), the remaining features of the scene may appear to be blurred in 3D. As described herein, unlike when a rendered scene is blurred in two dimensions (e.g., using a 2D blur operation), applying the techniques described herein may result in a scene blur that maintains visual clues indicating 3D depth (e.g., 3D perspective). In some embodiments, this blur operation may cause the user to focus on what is important in the scene (i.e., the selected feature). As noted above and described in more detail below, the 3D map may, in effect, be pivoted about the focus point to generate alternate views of the map, and these alternate views may be blended together to create a blurred version of the map. This blurred version of the map may be rendered along with an unblurred (i.e., crisp) version of the selected feature to highlight the selected feature within the otherwise blurred map.

Figure 4:
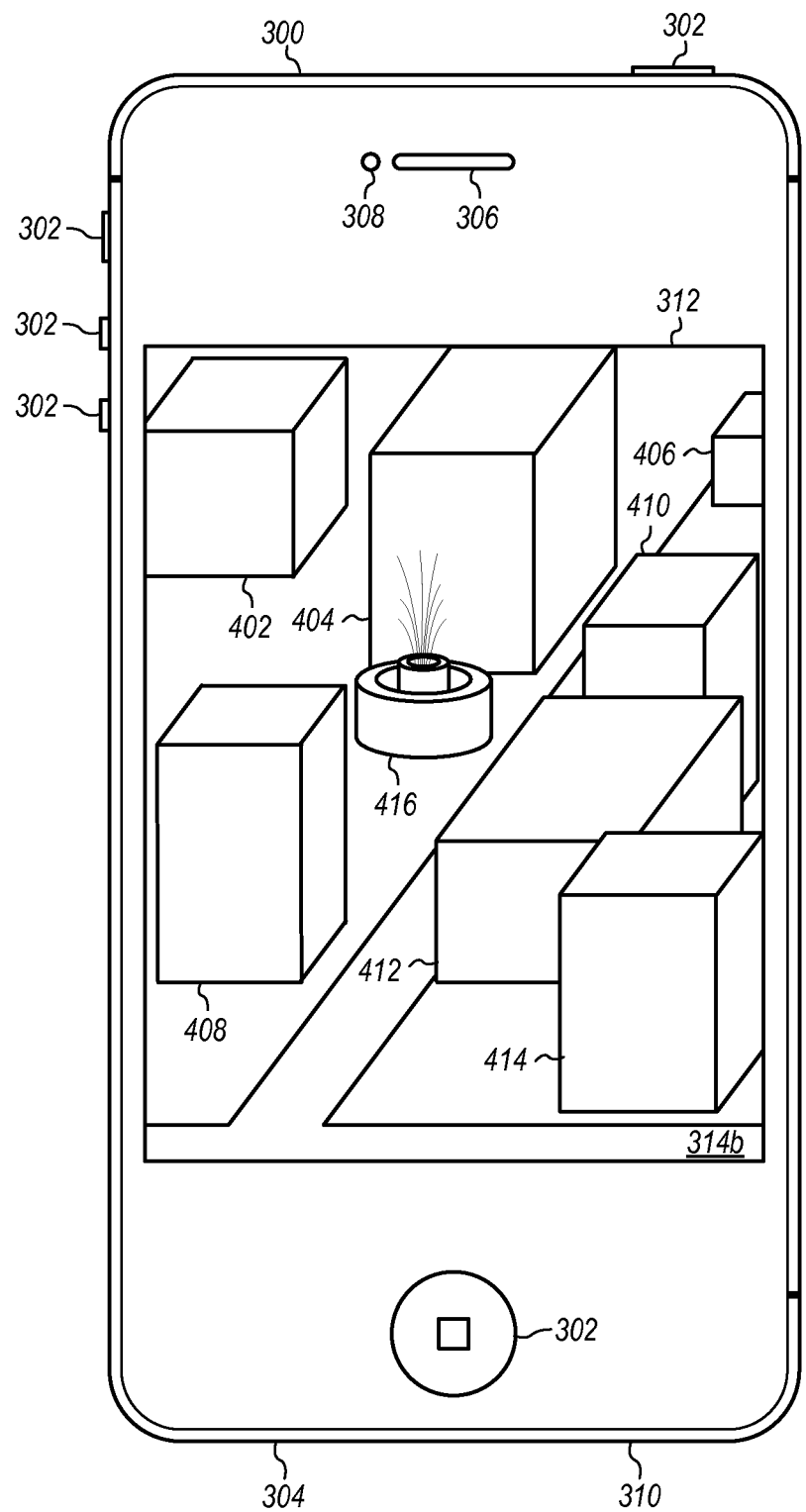
FIG. 4 illustrates a multifunction device on which a mapping or navigation application displays a simplified view of a 3D map, according to one embodiment.

FIG. 4 illustrates a multifunction device 300 on which a mapping or navigation application is displaying a simplified bird's eye view of a 3D map, according to one embodiment. In this example, the map (which is drawn in perspective to provide visual clues indicating the relative depth of various features in the scene) depicts an area that contains two roads, a collection of buildings (modeled simply as 3D blocks of various sizes and shapes, and labeled as 402-414), and a fountain 416. As described herein, a map tool of the mapping or navigation application may in some embodiments be configured to detect selection of a feature of the map (or receive information specifying such a selection) and to highlight the selected feature using a blur operation on the map that preserves the visual clues indicating the depth of the illustrated features in 3D space.

Figure 5:
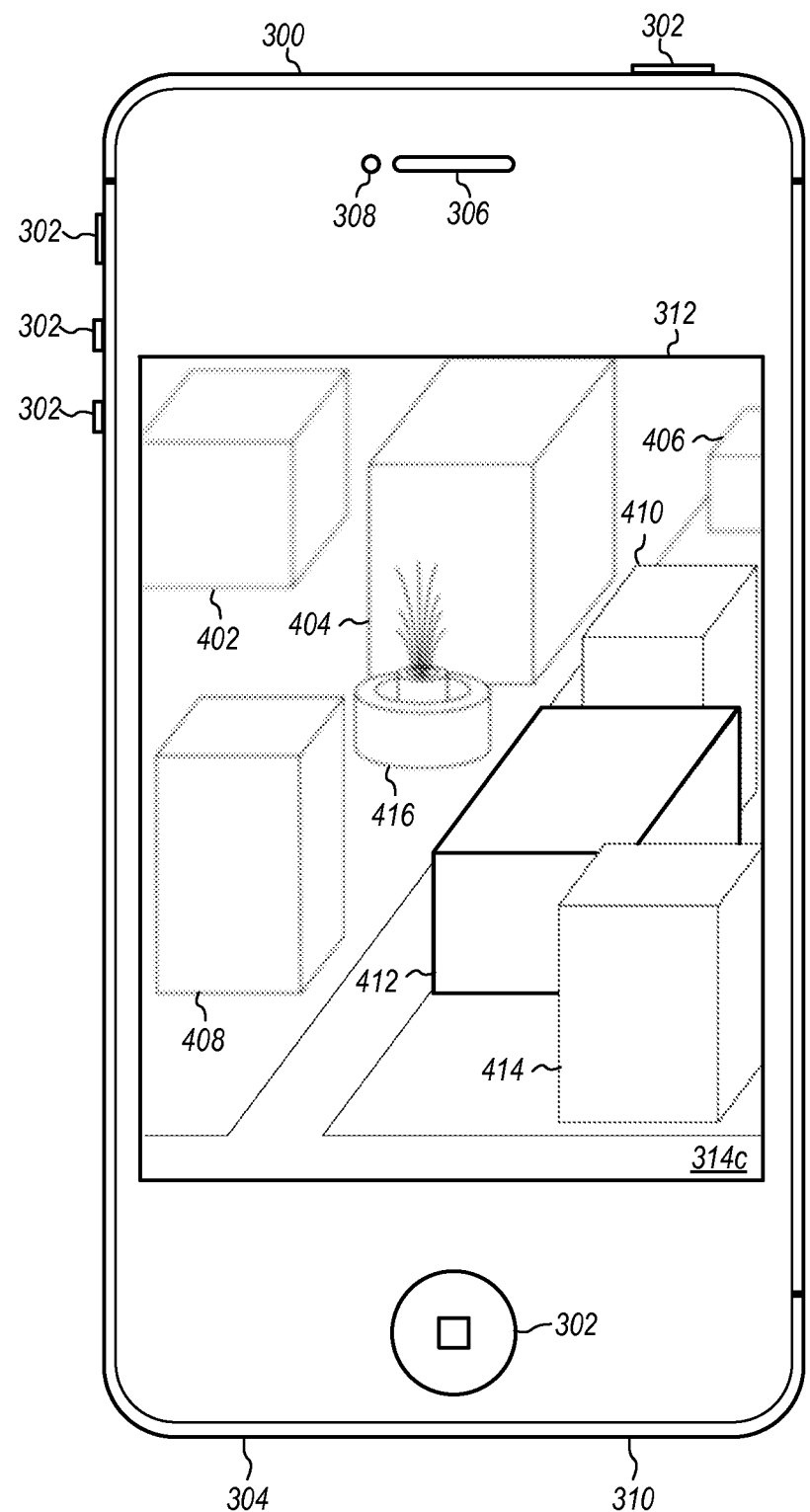
FIG. 5 illustrates a multifunction device on which a mapping or navigation application displays the 3D map depicted in FIG. 4 following the selection and highlighting of one of the buildings in the scene, according to some embodiments.

FIG. 5 illustrates the same multifunction device 300 displaying a modified version of the 3D map that was depicted in FIG. 4 following the selection and highlighting of one of the buildings in the scene (i.e., the building labeled as 412), according to some embodiments. In this example, the other features depicted in the scene (i.e., the roads, the other buildings, and the fountain) have been blurred by varying amounts based on their distance (in 3D space) from selected building 412, while selected building 412 is crisp and in focus. For example, buildings 414 and 410 (which are close to selected building 412) are slightly blurred; buildings 404 and 408, and fountain 416 are more blurred; and buildings 402 and 406 (which are the farthest away from selected building 412) are the most blurred.

Figure 6:
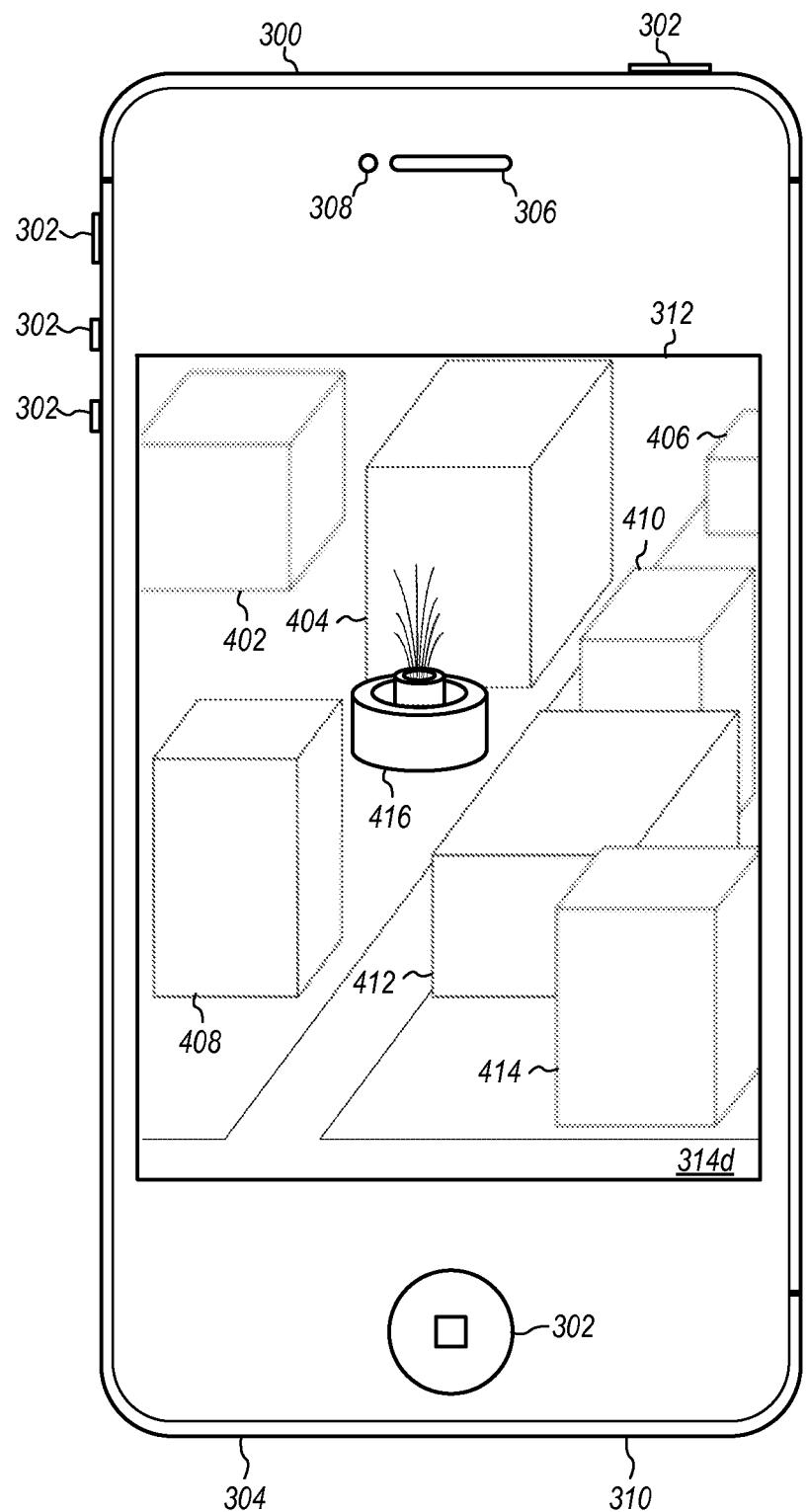
FIG. 6 illustrates a multifunction device on which a mapping or navigation application displays the 3D map depicted in FIG. 4 following the selection and highlighting of another feature in the scene, according to some embodiments.

FIG. 6 illustrates the same multifunction device 300 displaying a modified version of the 3D map that was depicted in FIG. 4 following the selection and highlighting of the fountain in the scene (which is labeled as 416), according to some embodiments. In this example, the other features depicted in the scene (i.e., the roads and the buildings) have been blurred by varying amounts based on their distance (in 3D space) from selected fountain 416, while selected fountain 416 is crisp and in focus. For example, buildings 404 and 408 (which are close to selected fountain 416) are slightly blurred; buildings 410 and 412 are more blurred; and buildings 402, 414, and 416 (which are the farthest away from selected fountain 416) are the most blurred.

As illustrated in the examples above, any of a variety of map features depicting real world 3D objects in the scene (e.g., roads, buildings, bridges, or other structures, and/or geological features, such as hills, bodies of water, etc.) may be selected for highlighting in a 3D map. In some embodiments, 3D map elements that do not correspond to real world objects in the depicted scene may also be selected for highlighting in a 3D map. For example, various map annotations that are represented in the 3D map view as 3D objects (e.g., virtual pins placed in the map; a park, subway station, or other area that has been annotated with a 3D bounding box; an avatar or other 3D model representing the application user in his current position in the scene; or a 3D box representing a label with which a real world feature or region of the map has been annotated) may be selected and highlighted using the techniques described herein.

As previously noted, in some embodiments, the techniques described herein may be used to blur a 3D map while preserving the appearance of 3D depth by pivoting the scene in 3D space and creating a 3D blur over several frames (e.g., several differently pivoted views), and then re-rendering the selected map feature on top of the blurred map to preserve the clarity of the selected feature. In other words, to create a blurred version of a 3D map from a map view generated from the perspective of an initial viewpoint, the map tool may pivot the scene away (slightly) from the initial viewpoint at several different angles, render the scene from the new viewpoints at those angles to generate alternate map views, and then blend them together to blur the 3D map. In some embodiments, because the 3D map is pivoted about a point on the selected feature (i.e., the focus point or pivot point), the position and orientation of the selected feature may not change very much in any of the alternate views. However, in order to display the selected feature as a crisp object, an unblurred version of the selected feature (e.g., as seen from the initial viewpoint) may be re-rendered (or accessed from stored image data) and superimposed on the blurred 3D map. Other features of the 3D map may be blurred by amounts that vary with their distance away from the pivot point, e.g., spherically outward from the pivot point. Another way to think of this is that the selected feature is the pivot point, and as one moves away from the pivot point, the other features in the 3D map are being translated over larger distances by the tilting of the camera As previously noted, the map blurring techniques described herein may maintain the appearance of depth in the blurred version of the 3D map. In other words, even though the resulting version of the 3D map is blurry, it is blurred in depth. For example, in some embodiments, everything close (in 3D space) to the selected feature may be less blurry, and things farther away (e.g., to the front, back, left, or right of the selected feature) may be progressively blurrier. In some embodiments, because the selected feature itself is crisp and because it is located in a portion of the image that is not very blurry, the selected feature may easily stand out in the scene. Because features farther away from the selected feature are themselves blurrier, and are located in portions of the image that are blurrier, they may be considerably less noticeable than the selected feature. By contrast, if a 2D rendering of a 3D map (i.e., a rendering with perspective) is blurred by applying a straight Gaussian blur or another 2D blur to the image data for the 2D screen canvas, the blur operation would essentially flatten the scene, "washing out" the 3D effect. In this case, if an unblurred version of the selected object were re-rendered and superimposed on the blurred map, it may look out of place in the scene, since the selected feature would still appear to have 3D depth, but everything around it would appear to be flattened. In addition, the blurred map itself may appear unnatural, since everything surrounding the crisp selected object would be blurred by the same amount.

As described in more detail below, the blur operation may in some embodiments include creating a line (or ray) from an initial view point to the selected map feature. The point at which this line (or ray) intersects the selected feature is the pivot point, and the blur operation may include performing several different pivots of the scene around that point (e.g., as if the scene were balanced at that point and is tilted forward once, backward once, right once, and left once). In some embodiments, image data representing each of those alternate renderings may be stored, and then blended together (e.g., by averaging or by applying a weighted averaging) to produce the blurred version of the map. Note that as a by-product of the blur operation described above (which involves tilting the 3D map about the selected feature), the blurring applied to various pixels in the image may inherently be weighted according their distance from the selected feature, since the pixels that are farther from the selected feature would have been translated (i.e., moved) by the tilting operations more than those that are close to the selected feature. The effect may be similar to a spherical blur, which is approximated in the map tool by performing a small number of tilts.

Figure 7A:
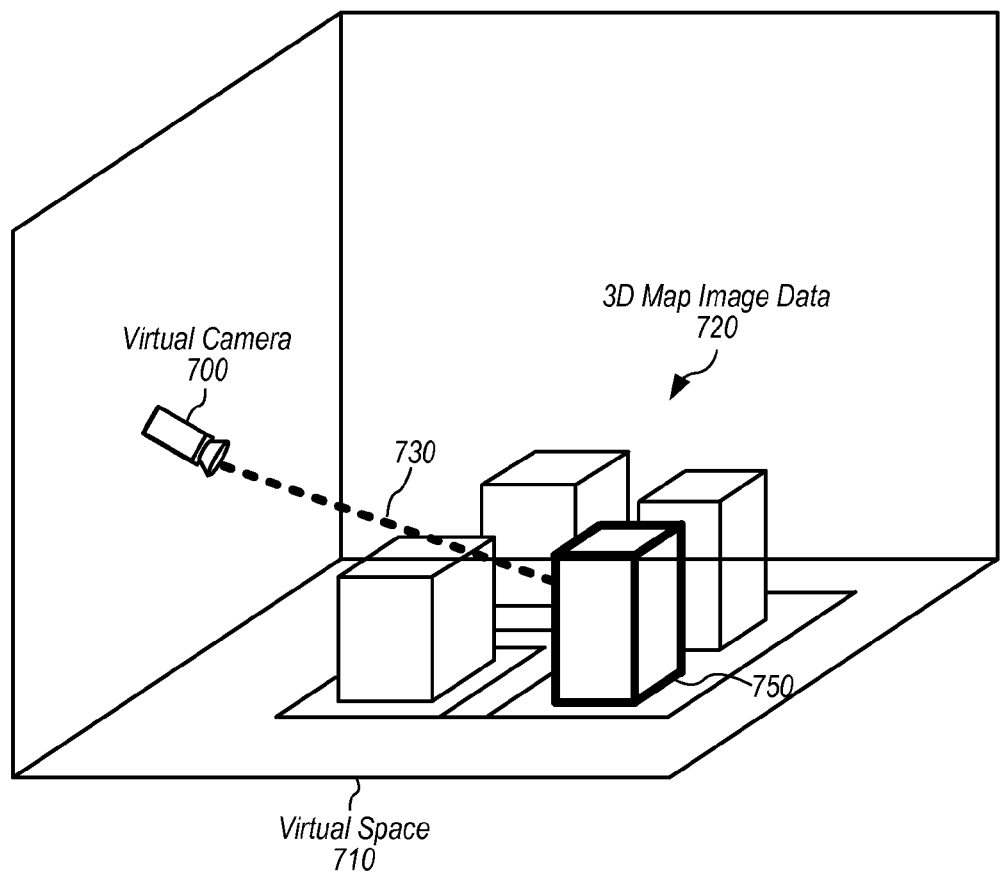
FIGS. 7A and 7B illustrate the movement of a virtual camera to different positions and orientations for generating alternate views of a 3D map as part of a blur operation, according to some embodiments.
Figure 7B:
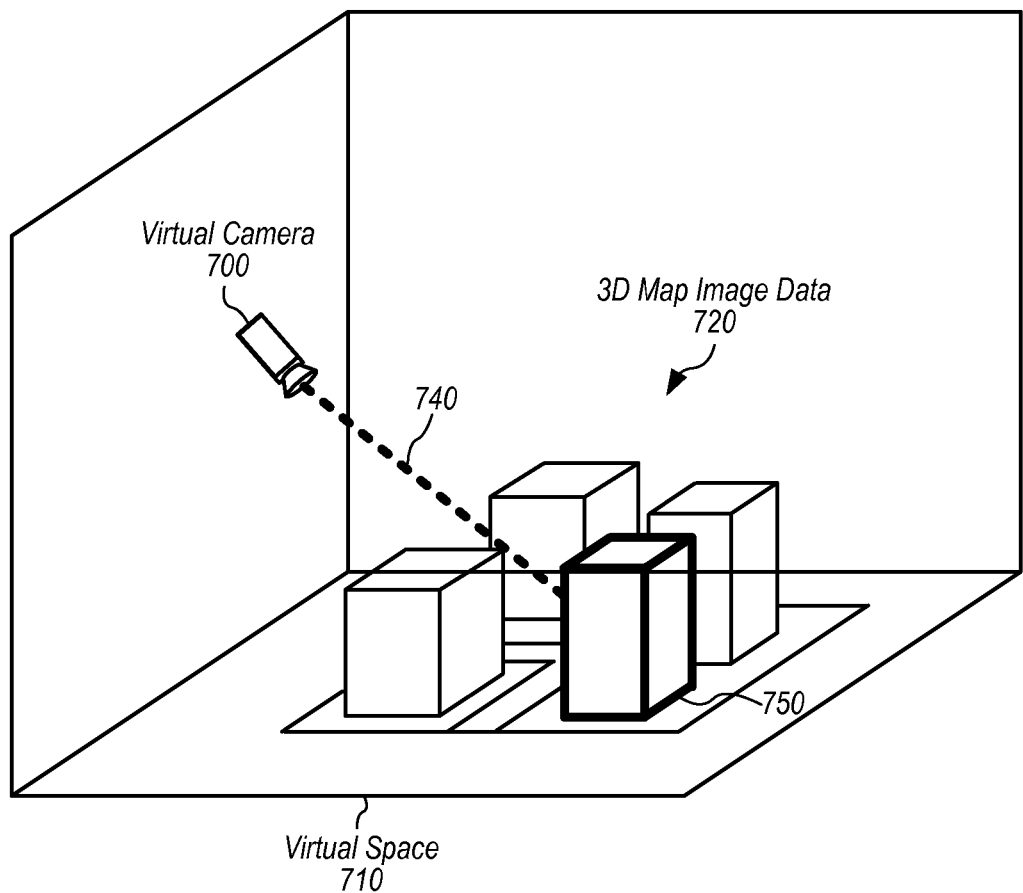

FIGS. 7A and 7B illustrate the movement of a virtual camera to different positions and orientations for generating alternate views of a 3D map as part of a blur operation, according to some embodiments. For example, FIG. 7A illustrates a virtual 700 camera in virtual space 710 as it observes 3D map image data 720. In this example, 3D map image data 720 represents a scene that includes four buildings. In this example, eye forward vector 730 is illustrated as a ray from the eye position of virtual camera 700 to selected building 750 in 3D map image data 720. One map view (which may be an initial map view or one of several alternate map views) may be generated from this perspective, as described herein.

As described herein, the position and/or orientation of virtual camera 700 may be changed to observe the 3D map image data 720 from a different perspective and to generate an alternate view of the 3D map from that perspective. For example, FIG. 7B illustrates virtual camera 700 in a different position and orientation within virtual space 710 than those depicted in FIG. 7A. In this example, eye forward vector 740 is illustrated as a ray from the eye position of virtual camera 700 in its new position and orientation to selected building 750 in 3D map image data 720. Another map view (e.g., one of several alternate map views) may be generated from this perspective, as described herein.

Example Methods

Figure 8:
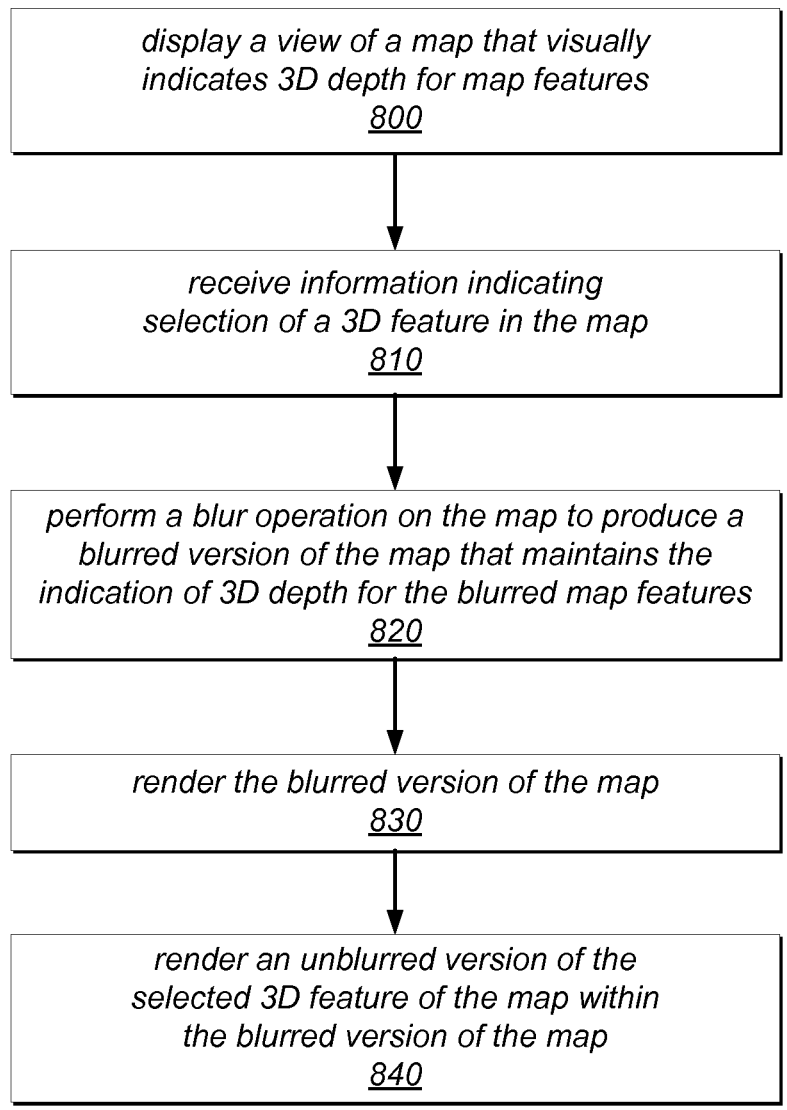
FIG. 8 is a flow diagram illustrating one embodiment of a method for highlighting a feature in a 3D map while preserving the appearance of depth.
Figure 9:
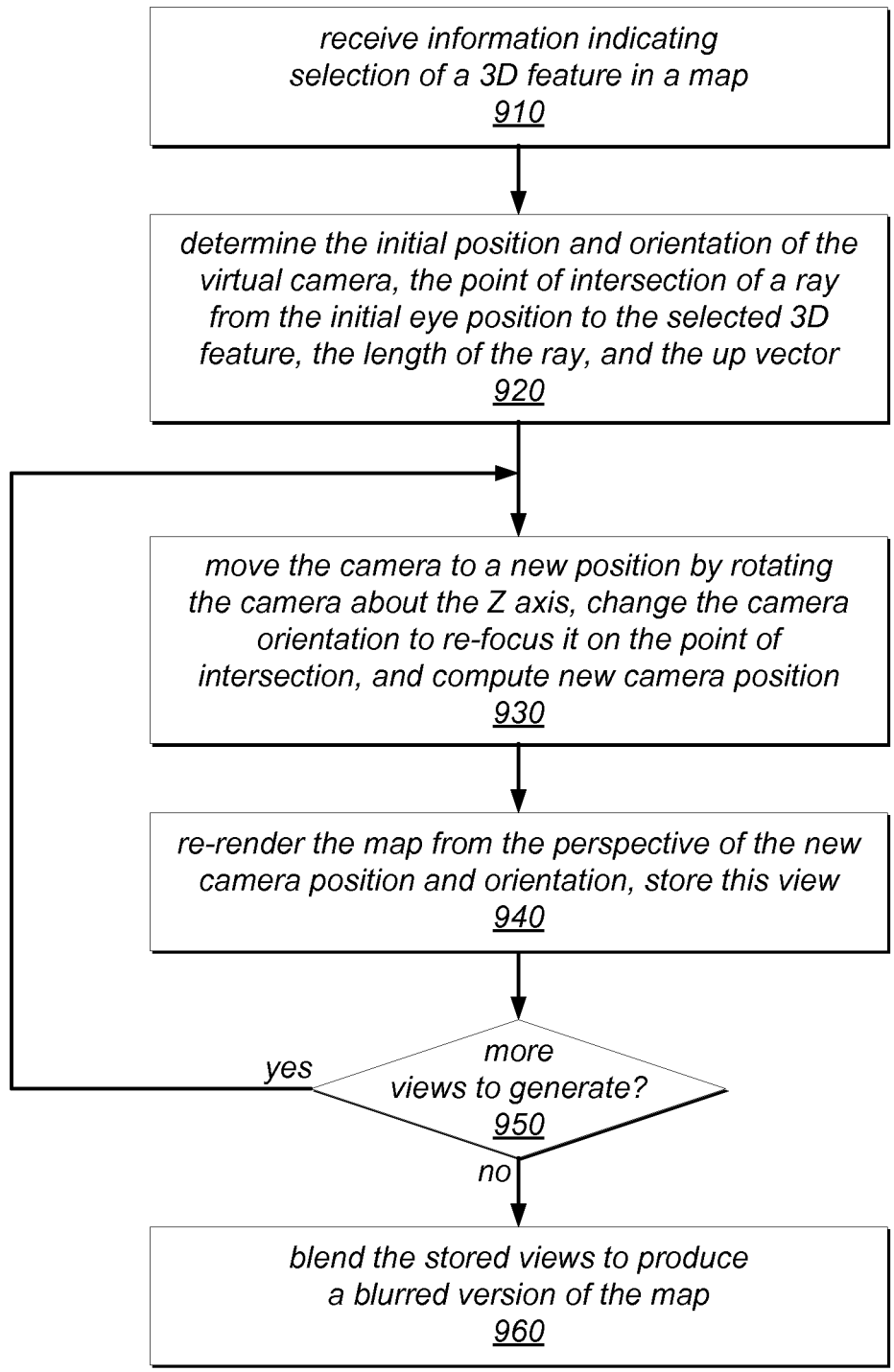
FIG. 9 is a flow diagram illustrating one embodiment of a method for performing a blur operation on a 3D map that preserves the appearance of depth.

Various embodiments of systems and methods for highlighting a feature in a 3D map while preserving depth may include methods that may be performed on one or more computers (such as computer system 1400 illustrated in FIG. 14 below) or portable electronic devices, such as the multifunction devices 300 described above. FIGS. 8 and 9 illustrate examples of such methods.

One embodiment of a method for highlighting a feature in a 3D map while preserving depth information is illustrated by the flow diagram in FIG. 8. As illustrated at 800, in this example, the method may include displaying a view of a map that visually indicates 3D depth for some or all of the features within the map (e.g., buildings and other structures, geological features, signs, or 3D representations of labels on the map). For example, the method may include a map tool of a mapping application or a navigation application displaying a map drawn with perspective so that a person viewing the map receives visual clues about the relative depth of the real world features depicted in the map.

As illustrated in this example, the method may include receiving information indicating the selection of a particular 3D feature in the map (e.g., for highlighting in the displayed map view), as in 810. As described herein, in some embodiments, the selection of a feature for highlighting may be performed by a user by "touching" it on the display (e.g., on a touch screen). In such embodiments, the map tool may perform a ray intersection to determine the feature that is being touched in the 3D map. In other embodiments, the selection of a feature for highlighting may be performed by the user selecting the feature from menu (e.g., a menu listing some or all of the buildings or other features and/or points of interest that are currently being displayed or that are included in map, a portion of which is currently being displayed) or from a list of search results, or, in general, using any available user interface mechanism for selecting a feature of a map. In still other embodiments, a feature may be automatically selected by the map tool as a point of interest in the portion of the map currently being displayed (e.g., in response to the user selecting the map view, navigating to the map view, or physically approaching the point of interest).

As illustrated in this example, the method may include performing a blur operation on the map to produce a blurred version of the map that maintains the indication of 3D depth for the blurred map features, as in 820. As described in more detail below, performing the blur operation may in some embodiments include generating two or more additional (i.e., alternate) views of the map, each of which represents the map from the perspective of a different viewing position and/or angle (e.g., as viewed through a virtual camera in different positions and/or orientations), and blending those additional views together (with or without the original map view). As illustrated in this example, the method may also include rendering the blurred version of the map (as in 830), and rendering an unblurred version of the selected 3D feature of the map within the blurred version of the map (as in 840). For example, in some embodiments, an unblurred version of the selected 3D feature may be superimposed on the blurred map in its original position in the originally displayed (i.e., unblurred) map view. Superimposing a crisp version of the selected 3D feature on the blurred version of the map may allow the map tool to provide visual clues about the relative depth of the real world features depicted in the blurred version of the map (e.g., through perspective), and may serve to highlight the selected feature in the map while visually indicating its position in 3D space relative to other features that are depicted in the map.

In some embodiments, additional highlighting of the selected 3D feature may be applied by modifying the image data for the blurred version of the map or the unblurred version of the selected 3D feature during rendering. For example, in some embodiments, the color value, brightness, contrast, and/or color saturation for the pixels of the blurred map may be modified so that features in the blurred map other than the selected feature may be less noticeable (e.g., so that they appear duller, softer, or more muted when compared to the selected feature), or so that the difference between the selected feature and all other (non-selected) features depicted in the map is more noticeable. In other embodiments, the color value, brightness, contrast, and/or color saturation for the pixels of the unblurred version of the selected feature may be modified so that the selected feature is more noticeable when rendered within (or superimposed on) the blurred version of the map (e.g., so that the selected feature appears brighter, sharper, or more vibrant when compared to the other features depicted in the map). For example, the method may include darkening the resulting blurred map so that the selected feature (which has not been darkened) may be further highlighted when displayed with its original brightness, contrast, and crispness within the blurred map. In another example, the saturation and/or contrast of the selected feature may be increased for the selected feature and/or decreased in the blurred map to further highlight the selected feature within the blurred map (e.g., to give the appearance that it glows).

In some embodiments, the highlighting technique describes herein begins with a user selecting a feature in a 3D map with a touch (e.g., on a touch screen of a multifunction device, such as those described herein, or other computing device). The 3D map may be displayed by a mapping application or a navigation application, and may include a map tool that performs some or all of the highlighting and rendering operations described herein. As previously noted, the map tool may perform a ray intersection to determine the feature that is being touched in the 3D map. After determining the feature that has been selected, the frame to be displayed (including highlighting of the selected feature) may be captured in several steps. Each step may translate the scene about a pivotal point (the focus point) of the selected map feature (e.g., in three or four directions) to capture a new frame, and the captured frames (each slightly pivoted about the focus point) may be blended together to create a Gaussian blur that is spherical in nature and that displays depth of the 3D scene.

In some embodiments, the pivotal frame changes may be computed as follows. The map tool may first determine the intersection of a ray from the eye position (e.g., as seen by a virtual rendering camera, or from the user's viewpoint into the 3D map) along the eye position's forward vector to the map terrain. This intersection point is referred to in this example and in the pseudo code below as the pivot point P. The map tool may also store the length of a vector between these two points (i.e., between the eye position and the pivot point), which is referred to in this example and in the pseudo code below as length L. The map tool may also store the orientation of the eye position for subsequent use in creating a collection of rotation matrixes, each referred to as $M_n$, where n refers to the $n^{th}$ tilting of the 3D map. The initial rotation matrix represents the initial (i.e., untilted) map view. The remaining steps may be performed as described in the following pseudo code, according to some embodiments.

```
// Ray intersection and initial position information
P = ray intersection of the eye forward vector with the 3D map
L = length of the ray from the eye position to P
U = up vector [0, 0, L]
D₀ = initial eye orientation
M is a rotation matrix about the Z axis of the scene
// Compute and update position with subsequent Mₙ
newEyeOrientation = Mₙ * D₀
rotationDirectionVector = U * newEyeOrientation
newEyePosition = P * rotationDirectionVector
```

In this example, it is assumed that a ray is received from the virtual camera or the user's eye into the 3D scene (e.g., into the center of the selected map feature). The pivot point P is the ray intersection of an eye forward vector (i.e., a vector in the direction in which the eye or camera is looking) from the eye into the selected feature in the map. The length of the vector L may be determined based on the known position of the virtual camera in the scene (i.e., its position in 3D space, as represented by its x, y, z coordinates) and the determined position of the selected feature and/or its pivot point (also represented by x, y, z coordinates). Note that when the viewing angle changes, the selected feature may appear to be farther way, but may not actually be farther away. Therefore, the map tool may determine L only once from the initial view of the 3D map.

As noted in the pseudo code above, the technique may be dependent on the "up vector". In this example, the up vector is similar to the eye forward vector, and may be thought of as a ray that is coming straight out of the top of the camera, and that has length L. The map tool may store the initial position of the camera (which is always known) and may determine (and then store) the initial camera orientation $D_0$ from the initial camera position information. As the camera is moved to new positions and is tilted, these values may be continually updated. In this example, a rotation matrix M may be created to store image data as the 3D map is rotated about the Z axis (i.e., the axis coming straight out of the scene toward the camera). In other embodiments, the alternate map views generated as part of the blur operation may be based on other types of rotations and/or tilting directions.

In some embodiments, the map tool may perform the first of its rotations based on the initial values described above, and then may compute and update the camera position for subsequent rotations. In this example, the eye position and eye orientation will move within the coordinate space of the map, and several rotations in Z may be computed according to a pre-determined or configurable (and/or adjustable) delta. After each rotation is applied to produce a new frame, the map tool may store the frame for subsequent blending.

In this example, the new eye orientation is the rotation matrix ($M_n$) about Z times the initial eye orientation, where $M_n$ is the $n^{th}$ tilting of the camera. For example, if the map tool performs four different tilts, it will produce four different rotation matrixes (which are modified versions of the initial rotation matrix saved by the map tool). These rotation matrixes may be referred to as $M_1$-$M_4$, and each may correspond to a pivot in a different direction. The example pseudo code above may be used to calculate the new position and orientation of the virtual camera about the pivot point. Note that the term "newEyePosition" refers to the position of the camera in the 3D scene (i.e., its x, y, z coordinates), while the term "newEyeOrientation" refers to the change in the orientation of the camera relative to its initial orientation. The "newRotationDirection" vector for the camera refers to the orientation of the camera when it is pointed at the pivot point after it has been moved to a new position. In this example, each new rotation direction vector for the camera is computed as the up vector times the new eye orientation (which was computed as $M_n*D_0$).

In this example, to re-position the camera in order to generate a new frame, the map tool may first rotate the camera about Z, then rotate the camera's orientation to re-focus it on the pivot point, and then calculate the new position of the camera. In other words, the matrix multiplication performed for calculating the new eye orientation causes a slight rotation of the camera (i.e., a tilt of the camera). Once the camera has been tilted (with respect to its initial orientation/tilt), the camera is no longer pointing at the selected feature (i.e., at the pivot point). Therefore, the camera is moved to a new position in space so that it is pointing at the selected feature (pivot point). Following the calculation of the new camera position and orientation, the camera is again pointing at the selected feature (pivot point) but from a different camera position and orientation than in the initial map view. These calculations may be performed sequentially before the map tool renders (draws) the frame for that tilt. In this example, when the map tools renders the 3D map again from the perspective of the camera in its new position and orientation, the result is a rendering of a map view that is tilted relative to the initial map view.

As previously noted, the map tool may perform rotations several times in different directions and then blend those renderings together to blur the map three-dimensionally. Note that the number of rotations (and corresponding alternate map views) may be any pre-determined or default value, or may be configurable, in different embodiments. For example, in one embodiment, the 3D map may be rotated by 2 degrees around the pivot point in each of four directions. In other embodiments, more or fewer alternate map views may be rendered, and they may be generated by rotating the scene by a lesser, greater, or same amount, or by different amounts.

One embodiment of a method for performing a blur operation on a 3D map that preserves depth is illustrated by the flow diagram in FIG. 9. As illustrated in this example, the method may include receiving information indicating the selection of a particular 3D feature in a map (as in 910). For example, the map (i.e., an initial view of a map) may be displayed by a map tool of a mapping application or a navigation application. As described above, selection of the particular 3D feature may be performed by a user (e.g., by direct selection on a touch screen, from a menu or list of search results, or by other means), or may be performed automatically by the map tool, in different embodiments. As illustrated at 920, the method may include determining the initial position and orientation of a virtual camera through which the currently displayed map view is seen, the point of intersection (which may also be referred to herein as the "pivot point") of a ray from the initial eye position of the viewer to the selected 3D feature in the direction that the eye is looking (which may also be referred to as the "eye forward vector"), the length of the ray, and the up vector (which may be similar to the eye forward vector and have the same length, but may represents a ray coming straight out of the top of the camera), as in 920.

After determining these initial elements, the method may include moving the virtual camera to a new position by rotating the virtual camera about the Z axis (i.e. the axis coming straight out of the scene toward the camera), changing the camera orientation to re-focus it on the point of intersection (i.e., the pivot point), and computing a new camera position, as in 930. In some embodiments, this may have the effect of rotating the map about the pivot point in a given direction in 3D space (e.g., as if tilting the map forward, back, left, or right, or rotating the map about the Z axis). As illustrated in this example, the method may include re-rendering the map from the perspective of the new camera position and orientation, and storing this map view (e.g., as one of multiple alternate views to be generated), as in 940. If there are more alternate views to generate, shown as the positive exit from 950, the method may include repeating the operations illustrated at 930 and 940 for each additional view (each of which represents the map as viewed from a different camera position and/or orientation). Once all of the desired alternate map views have been generated (shown as the negative exit from 950), the method may include blending the stored alternate map views to produce a blurred version of the map, as in 960. Note that this blur operation may in various embodiments generate a blurred version of the map that preserves visual clues about the depth of the features depicted in the map (e.g., the relative depth of the map features in different dimension and/or directions). In some embodiments, this blur operation may cause the blurring of each of the features depicted in the map (or elements thereof) to vary with their distance from the selected feature (or, more specifically, their distance from the pivot point) in 3D space.

In some embodiments, rather than performing a linear average of the image values of the alternate map views that are generated by tilting/pivoting the 3D map, the map tool may apply an additional weighting to the blur operation. In one embodiment, the map tool may weight the image values that are to be blended based on how far the camera was moved in 3D space (i.e., the change in the position of the camera). For example, an alternate view that was generated after moving the camera a long way from its initial position may be weighted such that it does not contribute as much to the final blurred version of the map than an alternate view that was generated after moving the camera a short distance from its initial position.

If the selected feature in a 3D map is occluded (or partially occluded) by another feature that is in front of it, the map tool may drop it from the scene when highlighting the selected feature, or may render the occluding map feature semi-transparently (e.g., so that the selected feature can be seen through the occluding feature), in different embodiments. In still other embodiments, if the selected feature is occluded (or partially occluded) by another feature in the foreground of the scene, the map tool may be configured to move the camera position so that it is in front of the occluding feature (e.g., such that it is between the occluding feature and the selected feature, or such that the occluding feature no longer blocks the selected feature due to zooming in a little closer to the selected feature or changing the position of that viewpoint). In some embodiments, the map tool may respond to the presence of an occluding map feature in different ways depending on the application in use and/or the specific use case involved. For example, the map tool may choose a particular one of these techniques (or another technique) depending on whether the user is merely browsing a scene with a map application (e.g., exploring a map by moving through the scene in an arbitrary way), or is navigating in the area (e.g., using a navigation application) and would prefer that the viewpoint reflect the actual current position of the user in 3D space (its x, y, z coordinates) as well as its position relative to the other features in the scene.

Note that while several examples described herein are directed to map tools, mapping applications, and/or navigation applications that are implemented on portable multifunction devices (e.g., mobile devices), in other embodiments, the techniques described herein may be implemented on other types of computing devices (e.g., in a desktop 3D mapping application or navigation application). In general, these techniques may be implemented in any type of architecture or environment, including in a client/server architecture, in a cloud computing environment, or on a single computing device, in different embodiments. As previously noted, in some embodiments, the techniques described herein may be integrated in a navigation application such that if a user is sight-seeing and visiting various landmarks, the map tool may be used to highlight various landmarks or other points of interest in the vicinity of the user. In other words, instead of the user selecting a feature in a 3D map to highlight, the map tool may (with input from the navigation application) highlight features of interest automatically (e.g., from a default set of landmarks, showing pre-selected features from a list, or selecting features to be highlighted based on the fact that the user has previously selected similar types of features for highlighting). In another example, a mapping or navigation application may display a "fly-through" of a city highlighting various landmarks in this fashion, and/or highlighting the user's destination.

Map Tool Module

Figure 10:
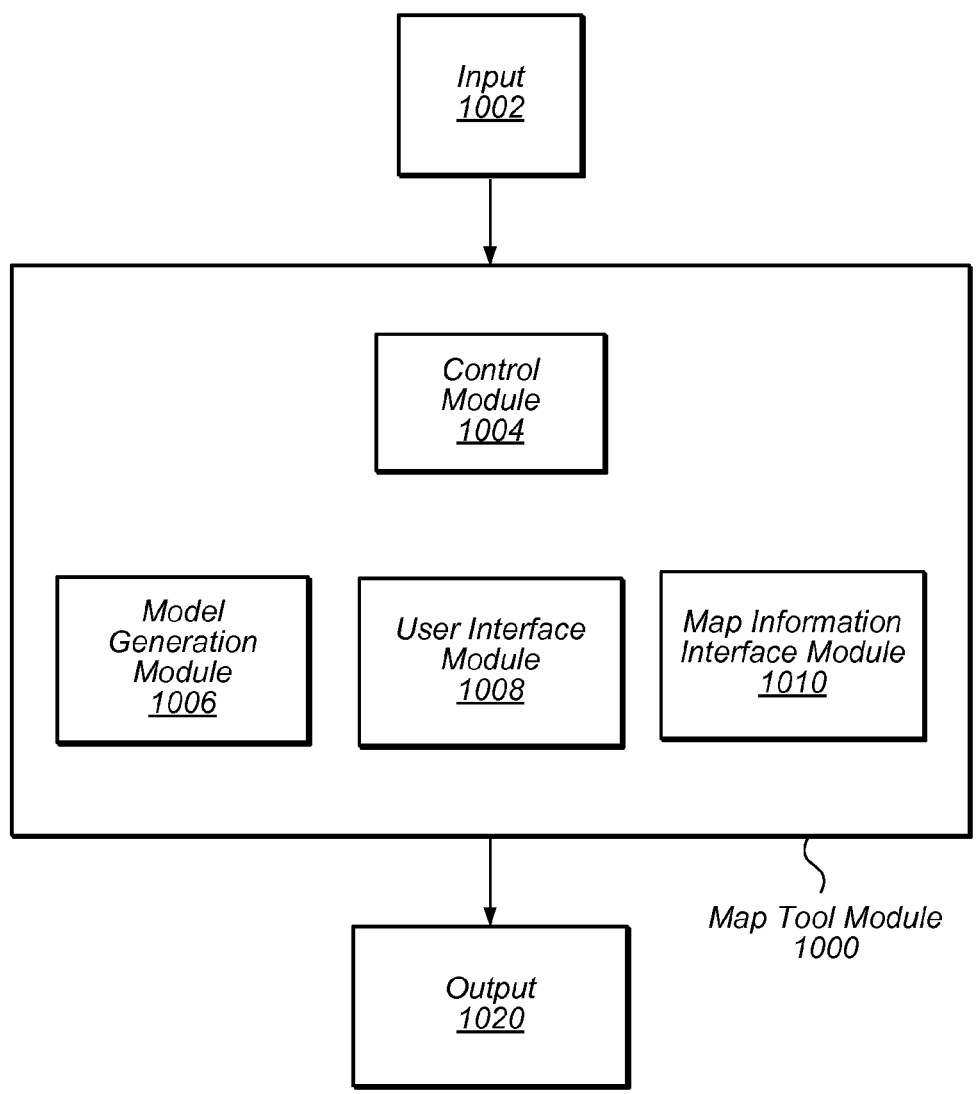
FIG. 10 illustrates a map tool module, according to some embodiments.

FIG. 10 illustrates one embodiment of a map tool module 1000. The map tool module 1000 may be implemented using a variety of different configurations to provide various functions of a map tool, including, but not limited to, those described herein. In the example illustrated in FIG. 10, the map tool module 1000 includes a control module 1004, a model generation module 1006, a user interface module 1008, and a map information interface module 1010.

In some embodiments, control module 1004 may receive input 1002, which may include various types of mapping information, as described herein. Given the mapping information, control module 1004 may invoke model generation module 1006 to generate a model of the environment corresponding to the received mapping information, according to various embodiments discussed herein.

Given a model of the environment, control module 1004 may invoke user interface module 1008 in response to various user inputs indicating, among other things, a selection of an object within a map view, information for labeling an object in the map view, or a request for more information or for specific information regarding an object in the map view, or a change in one or more display characteristics or parameters. In some embodiments, depending on the input, map tool module 1000 may communicate with a map service (such as map service 1330 illustrated in FIG. 13) through map information interface module 1010 to request and/or receive mapping information. Depending on the embodiment and current state, control module 1004 may provide a display of a map view as output 1020.

Note that the modules illustrated in FIG. 10 (e.g., control module 1004, model generation module 1006, user interface module 1008, and/or map information interface module 1010) may be implemented in hardware, in software, or in any combination thereof, in different embodiments. For example, any or all of these modules may be implemented as program instructions encoded on a non-transitory, computer-readable medium that when executed on one or more computers cause the computers to perform the functionality described herein.

Example Embodiment

Client/Server Architecture

Figure 11:
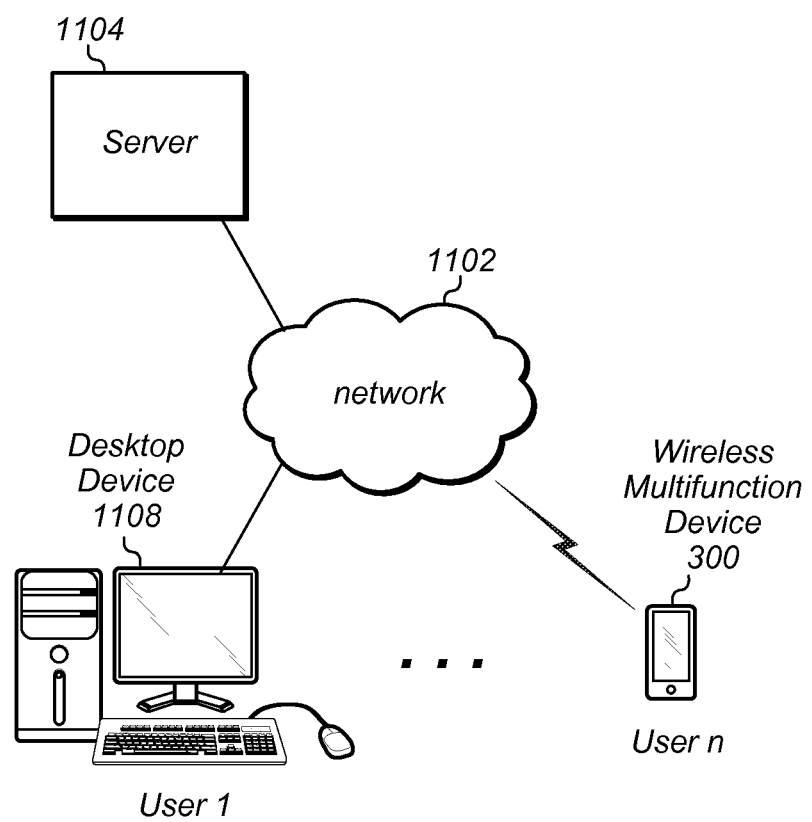
FIG. 11 illustrates a client/server architecture in which some embodiments of a map tool may operate.

FIG. 11 illustrates one embodiment of a computing environment in which various devices implementing a map tool may operate. In this example, the computing environment includes a server 1104, one or more desktop devices 1108 that serve as client devices, and one or more wireless multifunction devices 300 (such as those illustrated in FIGS. 3, 4A, 4B, and 5 and described in detail above) that serve as client devices. As illustrated in this example, multiple users (illustrated in FIG. 11 as Users 1-n) may communicate with server 1104 and/or each other over network 1102 using desktop devices 1108 and/or wireless multifunction devices 300. In some embodiments, a user at a desktop machine (e.g., one of desktop devices 1108) may enter an address of a given structure, a coordinate, or an identifier of a landmark, or the user may simply navigate to a given map location. Once the user arrives at a map location (i.e., once the desired location has been displayed to the user), the user may navigate as a user on a mobile device would navigate. In this way, without moving, a user at a stationary machine may navigate through a given map view such that the above-mentioned embodiments of a map tool may operate to present the user with a map view that is similar to the map view that a mobile user would see.

In the example illustrated in FIG. 10, server 1104 may send data representing a 3D map to one or more client devices (e.g., one or more of desktop devices 1108 and/or wireless multifunction devices 300). In this example, the client device(s) devices (e.g., one or more of desktop devices 1108 and/or wireless multifunction devices 300) may receive input indicating the selection of a feature in the 3D map (e.g., from the server, from an application implemented on the client device, or through a user interface on the client device), and may highlight the selected feature by rendering it as a crisp feature within an otherwise blurred 3D map, as described herein.

Example Embodiment

Cloud Computing Environment

Figure 12:
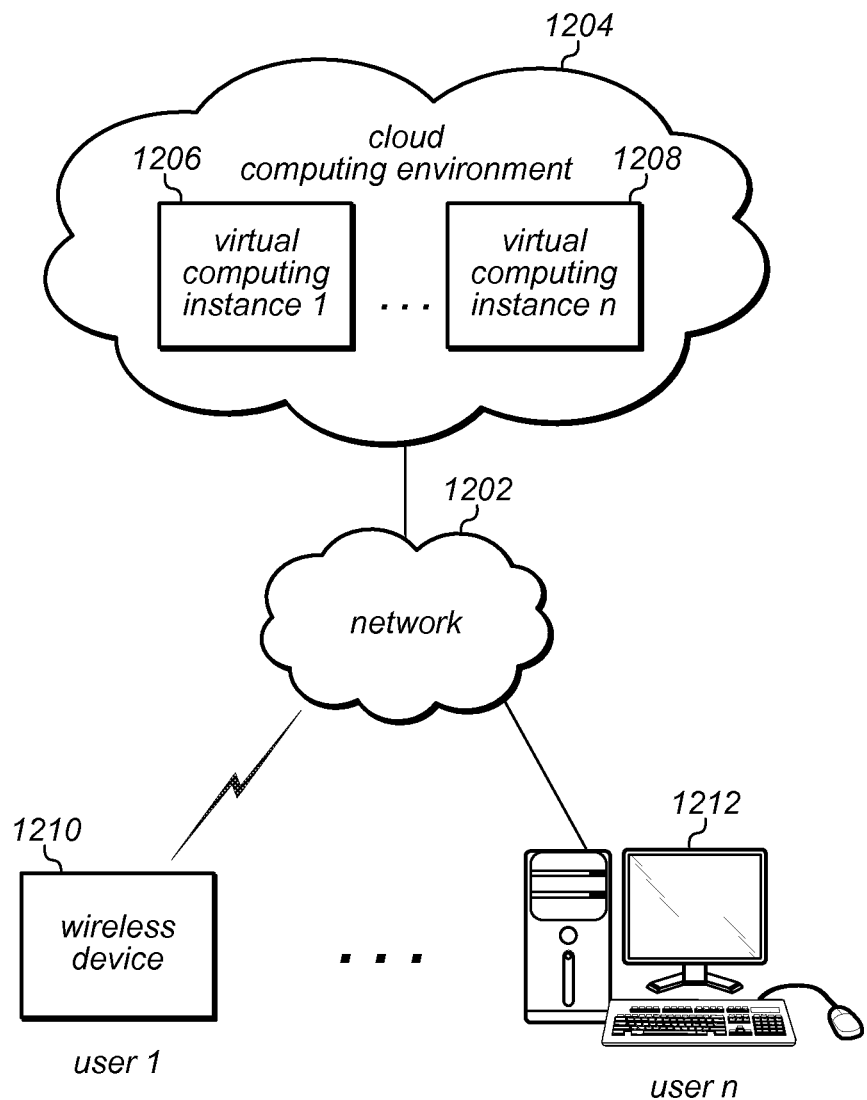
FIG. 12 illustrates a cloud computing environment in which some embodiments of a map tool may operate.

FIG. 12 illustrates another embodiment of a computing environment in which various devices implementing a map tool may operate. In this example, the computing environment includes multiple wired and/or wireless devices that access a cloud computing environment 1204 over network 1202. The cloud computing environment includes virtual computing instances 1-n, illustrated as elements 1206 through 1208. As illustrated in this example, an installed application on a wireless device 1210 or on a wired computer 1212 may be used to access any of the above-discussed embodiments of a map tool executing within one of the virtual computing instances 1206 through 1208. For example, a user (e.g., one of multiple users 1-n) may log into the cloud computing environment 1204 through the installed application to access a virtual computing instance within which an embodiment of the map tool is executing or may be executed. The map tool may be configured to receive input indicating the selection of a feature in the 3D map (e.g., from the cloud computing environment, from an application implemented on a wireless device 1210 or on a wired computer 1212, or through a user interface on a wireless device 1210 or on a wired computer 1212), and may highlight the selected feature by rendering it as a crisp feature within an otherwise blurred 3D map, as described herein.

In other embodiments, including those implementing a client/server architecture, as described herein, the map tool may be implemented as a client application on a wireless device 1210 or on a wired computer 1212 that accesses a cloud computing environment 1204 over network 1202 (e.g., to obtain or process map data).

Map Service Operating Environment

Figure 13:
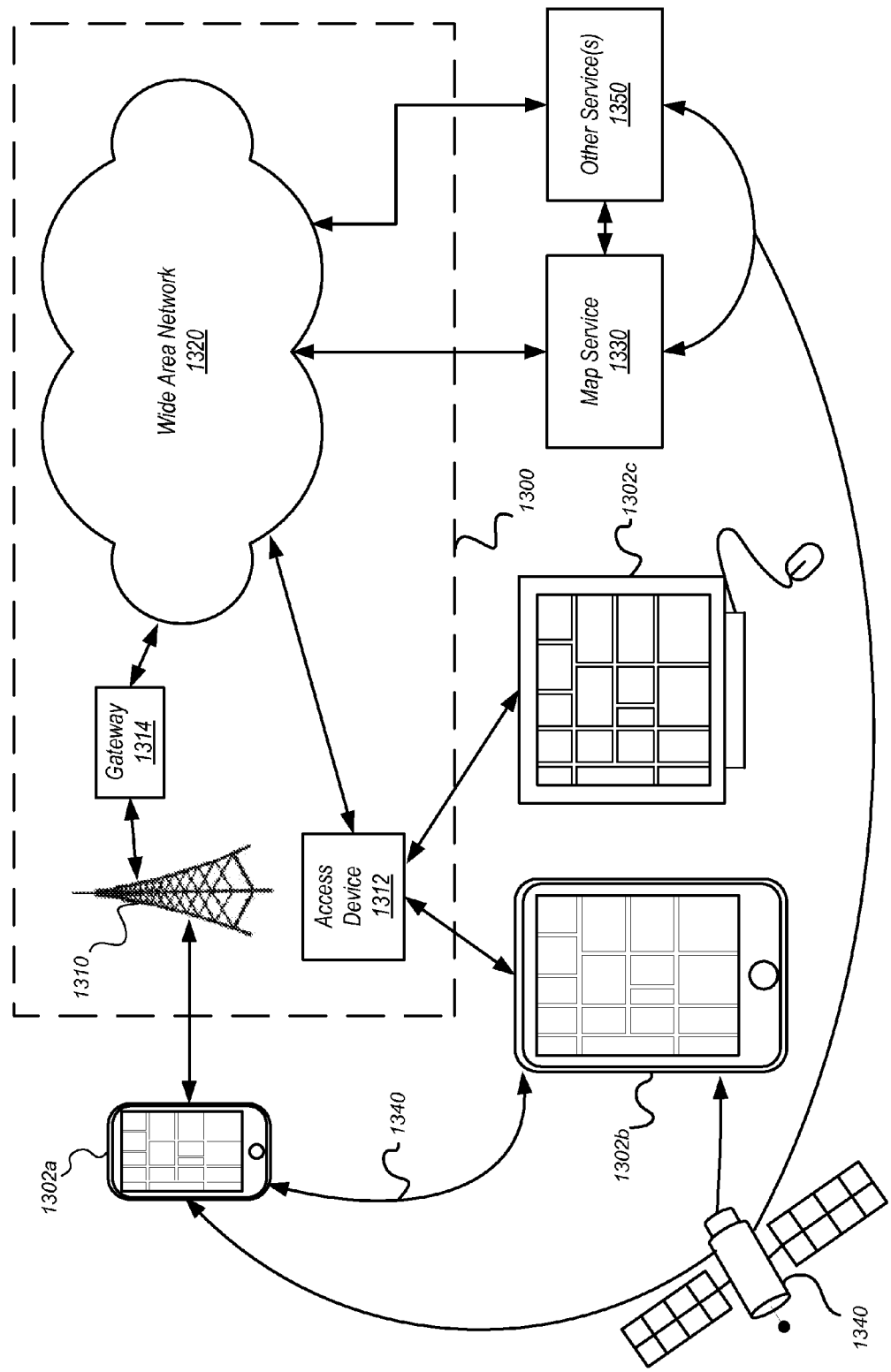
FIG. 13 illustrates an example map service operating environment configured to implement aspects of the system and method for highlighting a feature in a 3D map while preserving depth.

Various embodiments may operate within a map service operating environment. FIG. 13 illustrates a map service operating environment, according to some embodiments. A map service 1330 may provide map services for one or more client devices 1302a-1302c in communication with the map service 1330 through various communication methods and protocols. A map service 1330 generally may provide services, such as two-dimensional map image data (e.g., aerial view of roads utilizing satellite imagery), three-dimensional map image data (e.g., traversable map with three-dimensional features, such as buildings), route and direction calculation (e.g., ferry route calculations or directions between two points for a pedestrian), real-time navigation data (e.g., turn-by-turn visual navigation data in two or three dimensions), location data (e.g., where is the client device currently located), and other geographic data (e.g., wireless network coverage, weather, traffic information, or nearby points-of-interest). Client devices 1302a-1302c may utilize these map services by obtaining map service data. Client devices 1302a-1302c may implement various techniques to process map service data. Client devices 1302a-1302c may then provide map services to various entities, including, but not limited to, users, internal software or hardware modules, and/or other systems or devices external to the client devices 1302a-1302c.

In some embodiments, a map service may be implemented by one or more nodes in a distributed computing system. Each node may be assigned one or more services or component of a map service. Some nodes may be assigned the same map service or component of a map service. A load balancing node may distribute access or requests to other nodes within a map service. In some embodiments a map service may be implemented as a single system, for example a single server. Different modules or hardware devices within a server may implement one or more of the various services provided by a map service.

A map service may provide map services by generating map service data, which a map service may compose in varying formats for varying services. In some embodiments, one format of map service data may be map image data. Map image data may provide image data to a client device so that the client device may process the image data (e.g., rendering and/or displaying the image data as a two-dimensional or three-dimensional map). Map image data, whether in two or three dimensions, may be composed utilizing map tiles. A map tile is a portion of a larger map image. Assembling together the map tiles of a map may produce the original map. Tiles may be composed of map image data, routing or navigation data, or any other map service data. In some embodiments map tiles may be raster-based map tiles, with tile sizes ranging from any size both larger and smaller than the standard 256 pixel by 256 pixel tile. Raster-based map tiles may be encoded in any number of standard digital image representations including, but not limited to, Bitmap (.bmp), Graphics Interchange Format (.gif), Joint Photographic Experts Group (.jpg, .jpeg, etc.), Portable Networks Graphic (.png), or Tagged Image File Format (.tiff). In some embodiments, map tiles may be vector-based map tiles, encoded using vector graphics, including, but not limited to, Scalable Vector Graphics (.svg) or Drawing File (.drw). Embodiments may also include tiles with a combination of vector and raster data. Metadata or other information concerning the map tile may also be included within or along with a map tile, providing further map service data to a client device. It will be apparent to those of ordinary skill in the art that a map tile may be encoded for transport utilizing various well-known data structures and protocols, some of which are described in various examples below.

A map service may perform various techniques to analyze a map tile before encoding the tile for transport. This analysis may optimize map service performance for both client devices and a map service. In some embodiments map tiles may be analyzed for complexity, according to vector-based graphic techniques, and constructed utilizing complex and non-complex layers. Map tiles may also be analyzed for common image data or patterns that may be rendered as image textures and constructed by relying on image masks. In some embodiments, raster-based image data in a map tile may contain certain mask values, which are associated with one or more textures. Embodiments may also analyze map tiles for specified features that may be associated with certain map styles that contain style identifiers.

Other map services may generate map service data relying upon various data formats separate from a map tile. For example, map services that provide location data may utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Embodiments may also receive or request data from client devices identifying device capabilities or attributes (e.g., hardware specifications or operating system version) or communication capabilities (e.g., device communication bandwidth as determined by wireless signal strength or wire or wireless network type).

A map service may obtain map service data from internal or external sources. For example, satellite imagery used in map image data may be obtained from external services, or internal systems, storage devices, or nodes. Other examples may include, but are not limited to, GPS assistance servers, wireless network coverage databases, business or personal directories, weather data, government information (e.g., construction updates or road name changes), or traffic reports. Some embodiments of a map service may update map service data (e.g., wireless network coverage) for analyzing future requests from client devices.

Various embodiments of a map service may respond to client device requests for map services. These requests may be a request for a specific map or portion of a map. Embodiments may format requests for a map as requests for certain map tiles. In some embodiments, requests may also supply the map service with starting locations (or current locations) and destination locations for a route calculation. A client device may also request map service rendering information, such as map textures or stylesheets. In at least some embodiments, requests may also be one of a series of requests implementing turn-by-turn navigation. Requests for other geographic data may include, but are not limited to, current location, wireless network coverage, weather, traffic information, or nearby points-of-interest.

A map service may, in some embodiments, may analyze client device requests to optimize a device or map service operation. For example, a map service may recognize that the location of a client device is in an area of poor communications (e.g., weak wireless signal) and send more map service data to supply a client device in the event of loss in communication or send instructions to utilize different client hardware (e.g., orientation sensors) or software (e.g., utilize wireless location services or Wi-Fi positioning instead of GPS-based services). In another example, a map service may analyze a client device request for vector-based map image data and determine that raster-based map data better optimizes the map image data according to the image's complexity. Embodiments of other map services may perform similar analysis on client device requests and as such the above examples are not intended to be limiting.

Various embodiments of client devices 1302a-1302c may be implemented. One such example is a portable-multifunction device illustrated in FIGS. 1 through 3. Client devices 1302a-1302c may utilize map service 1330 through various communication methods and protocols described below. In some embodiments, client devices 1302a-1302c may obtain map service data from map service 1330. Client devices 1302a-1302c may request or receive map service data. Client devices 1302a-1302c may then process map service data (e.g., render and/or display the data) and may send the data to another software or hardware module on the device or to an external device or system.

A client device may, according to some embodiments, implement techniques to render and/or display maps. These maps may be requested or received in various formats, such as map tiles described above. A client device may render a map in two-dimensional or three-dimensional views. Some embodiments of a client device may display a rendered map and allow a user, system, or device providing input to manipulate a virtual camera in the map, changing the map display according to the virtual camera's position, orientation, and field-of-view. Various forms and input devices may be implemented to manipulate a virtual camera. In some embodiments, touch input, through certain single or combination gestures (e.g., touch-and-hold or a swipe) may manipulate the virtual camera. Other embodiments may allow manipulation of the device's physical location to manipulate a virtual camera. For example, a client device may be tilted up from its current position to manipulate the virtual camera to rotate up. In another example, a client device may be tilted forward from its current position to move the virtual camera forward. Other input devices to the client device may be implemented including, but not limited to, auditory input (e.g., spoken words), a physical keyboard, mouse, and/or a joystick.

Embodiments may provide various visual feedback to virtual camera manipulations, such as displaying an animation of possible virtual camera manipulations when transitioning from two-dimensional map views to three-dimensional map views. As described in detail herein, some embodiments may also allow input to select a map feature or object (e.g., a building) and highlight the object, producing a blur effect that maintains the virtual camera's perception of three-dimensional space.

In some embodiments, a client device may implement a navigation system (e.g., turn-by-turn navigation). A navigation system provides directions or route information, which may be displayed to a user. Embodiments of a client device may request directions or a route calculation from a map service. A client device may receive map image data and route data from a map service. In some embodiments, a client device may implement a turn-by-turn navigation system, which provides real-time route and direction information based upon location information and route information received from a map service and/or other location system, such as Global Positioning Satellite (GPS). A client device may display map image data that reflects the current location of the client device and update the map image data in real-time. A navigation system may provide auditory or visual directions to follow a certain route.

A virtual camera may be implemented to manipulate navigation map data according to some embodiments. Some embodiments of client devices may allow the device to adjust the virtual camera display orientation to bias toward the route destination. Embodiments may also allow virtual camera to navigation turns simulating the inertial motion of the virtual camera.

Client devices may implement various techniques to utilize map service data from map service. Embodiments may implement some techniques to optimize rendering of two-dimensional and three-dimensional map image data. In some embodiments, a client device may locally store rendering information. For example, a client may store a stylesheet which provides rendering directions for image data containing style identifiers. In another example, common image textures may be stored to decrease the amount of map image data transferred from a map service. Client devices may also implement various modeling techniques to render two-dimensional and three-dimensional map image data, examples of which include, but are not limited to: generating three-dimensional buildings out of two-dimensional building footprint data; modeling two-dimensional and three-dimensional map objects to determine the client device communication environment; generating models to determine whether map labels are seen from a certain virtual camera position; and generating models to smooth transitions between map image data. Some embodiments of client devices may also order or prioritize map service data in certain techniques. For example, a client device may detect the motion or velocity of a virtual camera, which if exceeding certain threshold values, lower-detail image data will be loaded and rendered of certain areas. Other examples include: rendering vector-based curves (and/or curves for which parametric curve data is available) as a series of points, preloading map image data for areas of poor communication with a map service, adapting textures based on display zoom level, or rendering map image data according to complexity.

In some embodiments, client devices may communicate utilizing various data formats separate from a map tile. For example, some client devices may implement Assisted Global Positioning Satellites (A-GPS) and communicate with location services that utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Client devices may also receive GPS signals directly. Embodiments may also send data, with or without solicitation from a map service, identifying the client device's capabilities or attributes (e.g., hardware specifications or operating system version) or communication capabilities (e.g., device communication bandwidth as determined by wireless signal strength or wire or wireless network type).

FIG. 13 illustrates one possible embodiment of an operating environment 1300 for a map service 1330 and client devices 1302a-1302c. In some embodiments, devices 1302a, 1302b, and 1302c can communicate over one or more wire or wireless networks 1310. For example, wireless network 1310, such as a cellular network, can communicate with a wide area network (WAN) 1320, such as the Internet, by use of gateway 1314. A gateway 1314 may provide a packet oriented mobile data service, such as General Packet Radio Service (GPRS), or other mobile data service allowing wireless networks to transmit data to other networks, such as wide area network 1320. Likewise, access device 1312 (e.g., IEEE 802.11g wireless access device) can provide communication access to WAN 1320. Devices 1302a and 1302b can be any portable electronic or computing device capable of communicating with a map service, such as a portable multifunction device described below with respect to FIGS. 1 to 3. Device 1302c can be any non-portable electronic or computing device capable of communicating with a map service.

In some embodiments, both voice and data communications can be established over wireless network 1310 and access device 1312. For example, device 1302a can place and receive phone calls (e.g., using voice over Internet Protocol (VoIP) protocols), send and receive e-mail messages (e.g., using Simple Mail Transfer Protocol (SMTP) or Post Office Protocol 3 (POP3)), and retrieve electronic documents and/or streams, such as web pages, photographs, and videos, over wireless network 1310, gateway 1314, and WAN 1320 (e.g., using Transmission Control Protocol/Internet Protocol (TCP/IP) or User Datagram Protocol (UDP)). Likewise, in some implementations, devices 1302b and 1302c can place and receive phone calls, send and receive e-mail messages, and retrieve electronic documents over access device 1312 and WAN 1320.

Devices 1302a and 1302b can also establish communications by other means. For example, wireless device 1302a can communicate with other wireless devices (e.g., other devices 1302a or 1302b, cell phones) over the wireless network 1310. Likewise devices 1302a and 1302b can establish peer-to-peer communications 1340 (e.g., a personal area network) by use of one or more communication subsystems, such as Bluetooth® communication from Bluetooth Special Interest Group, Inc. of Kirkland, Wash. 1302c can also establish peer to peer communications with devices 1302a or 1302b. (not pictured). Other communication protocols and topologies can also be implemented. Devices 1302a and 1302b may also receive Global Positioning Satellite (GPS) signals from GPS 1340.

Devices 1302a, 1302b, and 1302c can communicate with map service 1330 over the one or more wire and/or wireless networks, 1310 or 1312. For example, map service 1330 can provide a map service data to rendering devices 1302a, 1302b, and 1302c. Map service 1330 may also communicate with other services 1350 to obtain data to implement map services. Map service 1330 and other services 1350 may also receive GPS signals from GPS 1340.

Example Computer System

Figure 14:
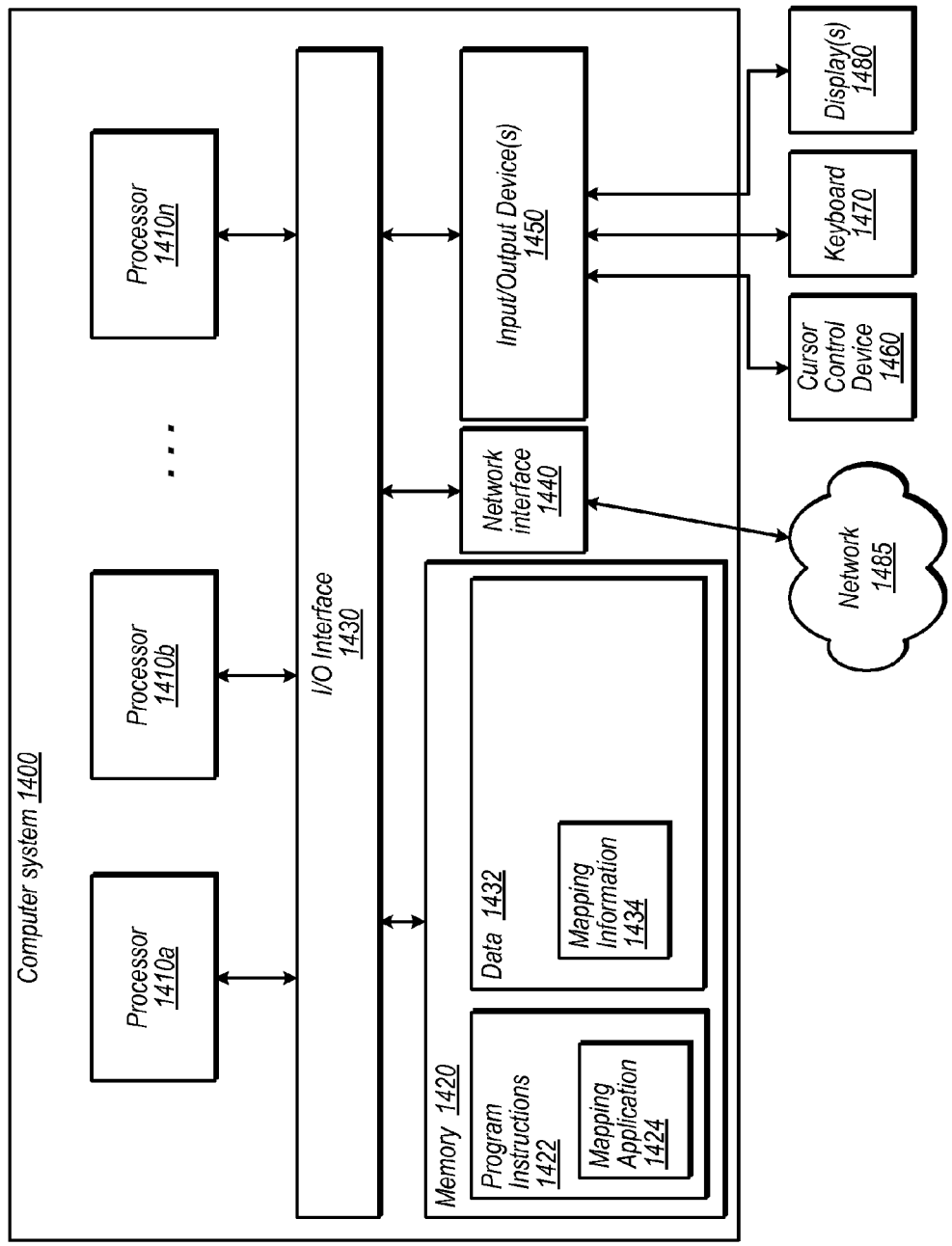
FIG. 14 illustrates an example computer system configured to implement aspects of the system and method for highlighting a feature in a 3D map while preserving depth.

FIG. 14 illustrates computer system 1400 that is configured to execute any or all of the embodiments described above. In different embodiments, computer system 1400 may be any of various types of devices, including, but not limited to, a personal computer system, desktop computer, laptop, notebook, tablet, slate, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a system and method for highlighting features in a 3D map while preserving depth, as described herein, may be executed on one or more computer systems 1400, which may interact with various other devices. Note that any component, action, or functionality described above with respect to FIGS. 1-13 may be implemented on one or more computers configured as computer system 1400 of FIG. 14, according to various embodiments. In the illustrated embodiment, computer system 1400 includes one or more processors 1410 coupled to a system memory 1420 via an input/output (I/O) interface 1430. Computer system 1400 further includes a network interface 1440 coupled to I/O interface 1430, and one or more input/output devices 1450, such as cursor control device 1460, keyboard 1470, and display(s) 1480. In some cases, it is contemplated that embodiments may be implemented using a single instance of computer system 1400, while in other embodiments multiple such systems, or multiple nodes making up computer system 1400, may be configured to host different portions or instances of embodiments. For example, in one embodiment some elements may be implemented via one or more nodes of computer system 1400 that are distinct from those nodes implementing other elements.

In various embodiments, computer system 1400 may be a uniprocessor system including one processor 1410, or a multiprocessor system including several processors 1410 (e.g., two, four, eight, or another suitable number). Processors 1410 may be any suitable processor capable of executing instructions. For example, in various embodiments processors 1410 may be general-purpose or embedded processors implementing any of a variety of instruction set architectures (ISAs), such as the x86, PowerPC, SPARC, or MIPS ISAs, or any other suitable ISA. In multiprocessor systems, each of processors 1410 may commonly, but not necessarily, implement the same ISA.

System memory 1420 may be configured to store program instructions 1422 and/or data 1432 accessible by processor 1410. In various embodiments, system memory 1420 may be implemented using any suitable memory technology, such as static random access memory (SRAM), synchronous dynamic RAM (SDRAM), nonvolatile/Flash-type memory, or any other type of memory. In the illustrated embodiment, program instructions 1422 may be configured to implement a mapping application 1424 incorporating any of the functionality described above. Additionally, data 1432 of memory 1420 may include mapping information 1434 including any of the information or data structures described above, including but not limited to mapping information for rendering map instances, position information indicating past or current positions of the user, image data for an initial map view and/or various map features thereof, image data for multiple alternate map views, image data for the blurred version of a 3D map, output data (i.e., image data representing an unblurred selected feature within a blurred version of a 3D map), various parameter values used in implementing the techniques described herein (e.g., parameter values specifying the number of alternate map views to be generated, the angles by which to tilt the initial 3D map view to generate those alternate map views, etc.), and/or route information for navigating from an origination to a destination. In some embodiments, program instructions and/or data may be received, sent or stored upon different types of computer-accessible media or on similar media separate from system memory 1420 or computer system 1400. While computer system 1400 is described as implementing the functionality of functional blocks of previous Figures, any of the functionality described herein may be implemented via such a computer system.

In one embodiment, I/O interface 1430 may be configured to coordinate I/O traffic between processor 1410, system memory 1420, and any peripheral devices in the device, including network interface 1440 or other peripheral interfaces, such as input/output devices 1450. In some embodiments, I/O interface 1430 may perform any necessary protocol, timing or other data transformations to convert data signals from one component (e.g., system memory 1420) into a format suitable for use by another component (e.g., processor 1410). In some embodiments, I/O interface 1430 may include support for devices attached through various types of peripheral buses, such as a variant of the Peripheral Component Interconnect (PCI) bus standard or the Universal Serial Bus (USB) standard, for example. In some embodiments, the function of I/O interface 1430 may be split into two or more separate components, such as a north bridge and a south bridge, for example. Also, in some embodiments some or all of the functionality of I/O interface 1430, such as an interface to system memory 1420, may be incorporated directly into processor 1410.

Network interface 1440 may be configured to allow data to be exchanged between computer system 1400 and other devices attached to a network 1485 (e.g., carrier or agent devices) or between nodes of computer system 1400. Network 1485 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1440 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1450 may, in some embodiments, include one or more display terminals, keyboards, keypads, touchpads, scanning devices, voice or optical recognition devices, or any other devices suitable for entering or accessing data by one or more computer systems 1400. Multiple input/output devices 1450 may be present in computer system 1400 or may be distributed on various nodes of computer system 1400. In some embodiments, similar input/output devices may be separate from computer system 1400 and may interact with one or more nodes of computer system 1400 through a wired or wireless connection, such as over network interface 1440.

As shown in FIG. 14, memory 1420 may include program instructions 1422, which may be processor-executable to implement any element or action described above. In one embodiment, the program instructions may implement the methods described above, such as the methods illustrated by FIG. 8. In other embodiments, different elements and data may be included. Note that data 1432 may include any data or information described above.

Those skilled in the art will appreciate that computer system 1400 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1400 may be transmitted to computer system 1400 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A method of controlling display of a three-dimensional map on a computing device, comprising:
- displaying a view of at least a portion of the map such that the display indicates three-dimensional depth for features in the at least a portion of the map;
- receiving information indicating selection of one of the features in the at least a portion of the map in three-dimensional space, wherein the selected feature is in the three-dimensional space for the at least a portion of the map; and
- responsive to said receiving, highlighting the selected feature in the view of the at least a portion of the map, wherein said highlighting comprises:
  - performing a blur operation on the at least a portion of the map to produce a blurred version of the at least a portion of the map, wherein performing the blur operation comprises:
    - generating two or more alternate versions of the at least a portion of the map from two or more different viewing positions or angles, wherein the two or more different viewing positions or angles are focused on the selected feature; and
    - combining the two or more alternate versions of the at least a portion of the map to produce the blurred version of the at least a portion of the map, wherein the amount of blur in the blurred version of the at least a portion of the map varies with a distance from the highlighted selected feature in the three-dimensional space;
  rendering the blurred version of the at least a portion of the map; and
  rendering an unblurred version of the selected feature within the blurred version of the at least a portion of the map to highlight the selected feature within the at least a portion of the map.

2. The method of claim 1, wherein said combining comprises averaging values of pixels in a same position in the two or more alternate versions of the at least a portion of the map to generate a value for a pixel in a corresponding position of the blurred version of the at least a portion of the map.

3. The method of claim 1, wherein for each of the two or more alternate versions, said generating comprises generating a version of the at least a portion of the map that represents a view of the at least a portion of the map from a viewing angle that differs from the displayed view by a pre-determined amount in a respective direction.

4. The method of claim 1, further comprising modifying a color, brightness, contrast, or saturation value for at least some pixels of the blurred version of the at least a portion of the map or the unblurred version of the selected feature to further indicate the selection.

5. A system, comprising:
a memory; and
one or more processors coupled to the memory, wherein the memory comprises program instructions executable by the one or more processors to implement a mapping application configured to:
  apply a blur operation on image data for a three-dimensional scene to produce a blurred version of the three-dimensional scene, wherein said performing comprises:
    generating additional image data representing two or more modified versions of the three-dimensional scene, each rendered from the perspective of a different viewing position or angle, wherein the two or more modified versions of the three-dimensional scene are from viewing positions or angles focused on a particular three-dimensional feature in the three-dimensional scene;
    generating image data representing the blurred version of the three-dimensional scene dependent on the additional image data, wherein the amount of blur in the blurred version of the three-dimensional scene varies with a distance from the particular three-dimensional feature in the three-dimensional scene; and
  render the blurred version of the three-dimensional scene and an unblurred version of a particular three-dimensional feature in the three-dimensional scene, wherein the unblurred version of the particular three-dimensional feature is rendered in place within the blurred version of the three-dimensional scene.

6. The system of claim 5,
wherein the mapping application is further configured to receive information indicating selection of the particular three-dimensional feature in the three-dimensional scene; and
wherein said applying and said rendering are performed in response to said receiving.

7. The system of claim 5,
wherein the system further comprises a touch screen interface;
wherein the mapping application is further configured to, prior to said applying:
  detect a touch using the touch screen interface; and
  perform a ray intersection to determine that the particular three-dimensional feature in the three-dimensional scene was selected by the touch; and
wherein said generating additional image data comprises:
  pivoting the three-dimensional scene about a pivot point of the particular three-dimensional feature in two or more directions in three-dimensional space; and
  rendering the three-dimensional scene from the perspective of viewing positions and angles resulting from said pivoting.

8. The system of claim 5, wherein said generating image data representing the blurred version of the three-dimensional scene comprises computing an average or weighted average of image values in the two or more modified versions of the three-dimensional scene to generate image values for the blurred version of the three-dimensional scene.

9. A multifunction device, comprising:
one or more processors; and
one or more memories storing a mapping application that is executable on the one or more processors to:
  display a view of a three-dimensional scene from the perspective of a particular camera position and orientation;
  receive information indicating selection of a three-dimensional feature in the three-dimensional scene to be highlighted; and
  in response to said receiving:
    generate two or more additional views of the three-dimensional scene, each from the perspective of a different camera position or orientation, wherein the different camera positions or orientations are focused on the selected three-dimensional feature in the three-dimensional scene to be highlighted;
    combine the two or more additional views to create a blurred version of the three-dimensional scene, wherein the amount of blur in the blurred version of the three-dimensional scene varies with a distance from the selected feature three-dimensional feature in the three-dimensional scene to be highlighted; and
    display an unblurred version of the selected feature within the blurred version of the three-dimensional scene to highlight the selected feature within the three-dimensional scene.

10. The multifunction device of claim 9,
wherein the multifunction device further comprises a touch screen; and
wherein said receiving information comprises detecting a touch on the touch screen.

11. The multifunction device of claim 9, wherein said receiving information comprises detecting the selection of the three-dimensional feature from a menu, detecting the selection of the three-dimensional feature from a list of search results, or receiving information identifying the three-dimensional feature as a point of interest in the three-dimensional scene.

12. The multifunction device of claim 9, wherein said generating comprises generating the additional views from the perspective of a camera tilted at a pre-determined angle in each of two or more directions relative to the particular camera orientation.

13. The multifunction device of claim 9, wherein said generating comprises generating the additional views from the perspective of a camera whose position has been translated by a pre-determined amount in each of two or more directions relative to the particular camera position.

14. A non-transitory, computer-readable storage medium, storing program instructions executable on a computer to implement a mapping application configured to:
- render a view of a map such that its display indicates three-dimensional depth for features in the map;
- receive information indicating selection of a feature in the map; and
- responsive to said receiving:
  - perform a blur operation on the map to produce a blurred version of the map, wherein performing the blur operation comprises:
    - generating two or more additional views of the map from two or more different viewing positions or angles, wherein the two or more different viewing positions or angles are focused on the selected feature; and
    - combining the two or more additional views of the map to produce the blurred version of the view of the map, wherein the amount of blur in the blurred version of the view of the map varies with a distance from the selected feature in three-dimensional space;
  - render the blurred version of the map; and
  - render an unblurred version of the selected feature within the blurred version of the map to indicate its selection within the view of the map.

15. The non-transitory, computer-readable storage medium of claim 14,
- wherein another feature in the map occludes at least a portion of the selected feature; and
- wherein said rendering the blurred version of the map comprises rendering the other feature as a semi-transparent feature in the blurred version of the map.

16. The non-transitory, computer-readable storage medium of claim 14,
- wherein another feature in the map occludes at least a portion of the selected feature; and
- wherein said performing a blur operation further comprises generating at least one of the additional views from the perspective of a camera placed between the other feature and the selected feature in three-dimensional space.

17. The non-transitory, computer-readable storage medium of claim 14, wherein the mapping application is further configured to modify a color, brightness, contrast, or saturation value in image data for the blurred version of the map or for the unblurred version of the selected feature to further indicate the selection.

18. A non-transitory, computer-readable storage medium, storing program instructions executable on a computer to implement a navigation application configured to:
- display a view of a portion of a three-dimensional map from the perspective of a particular viewing position or angle;
- generate two or more additional views of the portion of the three-dimensional map, each from the perspective of a different viewing position or orientation, wherein the different viewing positions or orientations are focused on a point of interest depicted in the portion of the three-dimensional map;
- blend the two or more additional views to create a blurred version of the portion of the three-dimensional map, wherein the amount of blur in the blurred version of the portion of the three-dimensional map varies with a distance from the point of interest depicted in the portion of the three-dimensional map; and
- display an unblurred version of a three-dimensional representation of the point of interest depicted in the three-dimensional map within the blurred version of the portion of the three-dimensional map to highlight the point of interest.

19. The non-transitory, computer-readable storage medium of claim 18, wherein the point of interest comprises a map feature that was selected for highlighting within the three-dimensional map using a touch screen interface.

20. The non-transitory, computer-readable storage medium of claim 18, wherein the navigation application is further configured to, prior to said generating, automatically select the point of interest for highlighting within the three-dimensional map.

21. The non-transitory, computer-readable storage medium of claim 18, wherein the navigation application is further configured to:
- display a different portion of the three-dimensional map;
- generate two or more additional views of the different portion of the three-dimensional map, each from the perspective of a different viewing position or orientation;
- blend the two or more additional views of the different portion of the three-dimensional map to create a blurred version of the different portion of the three-dimensional map, wherein the blurred version of the different portion of the three-dimensional map presents an appearance of depth in the three-dimensional map; and
- display an unblurred version of a three-dimensional representation of another point of interest depicted in the three-dimensional map within the blurred version of the different portion of the three-dimensional map.

22. The non-transitory, computer-readable storage medium of claim 18, wherein said generating comprises generating the additional views from the perspective of a camera tilted at a pre-determined angle in each of two or more directions relative to the particular viewing angle, or generating the additional views from the perspective of a camera whose position has been translated by a pre-determined amount in each of two or more directions relative to the particular viewing position.

* * * * *